United States Patent
Banerjee et al.

(10) Patent No.: US 10,048,415 B2
(45) Date of Patent: Aug. 14, 2018

(54) NON-DICHROIC OMNIDIRECTIONAL STRUCTURAL COLOR

(71) Applicants: Toyota Motor Engineering & Manufacturing North America, Inc., Erlanger, KY (US); Viavi Solutions Inc., Milpitas, CA (US)

(72) Inventors: Debasish Banerjee, Ann Arbor, MI (US); Minjuan Zhang, Ann Arbor, MI (US); Paul Kohlmann, Windsor, CA (US); Masahiko Ishii, Okazaki (JP)

(73) Assignees: Toyota Motor Engineering & Manufacturing North America, Inc., Plano, TX (US); Vivai Solutions Inc., Milpitas, CA (US)

( * ) Notice: Subject to any disclaimer, the term of this patent is extended or adjusted under 35 U.S.C. 154(b) by 0 days.

(21) Appl. No.: 15/457,136

(22) Filed: Mar. 13, 2017

(65) Prior Publication Data

US 2017/0248746 A1    Aug. 31, 2017

Related U.S. Application Data

(63) Continuation of application No. 13/760,699, filed on Feb. 6, 2013, now abandoned, which is a
(Continued)

(51) Int. Cl.
*G02B 1/10* (2015.01)
*G02B 5/22* (2006.01)
(Continued)

(52) U.S. Cl.
CPC ............... *G02B 5/22* (2013.01); *B05D 5/061* (2013.01); *G02B 5/003* (2013.01); *G02B 5/085* (2013.01); *G02B 5/26* (2013.01)

(58) Field of Classification Search
CPC ........ G02B 5/085; G02B 5/0858; G02B 5/26; G02B 5/285
(Continued)

(56) References Cited

U.S. PATENT DOCUMENTS 3,247,392 A    4/1966  Thelen
3,650,790 A    3/1972  Klenke et al.
(Continued)

FOREIGN PATENT DOCUMENTS

CN    1527100 A    9/2004
CN    1741246 A    3/2006
(Continued)

OTHER PUBLICATIONS

Sajeev John et al., "Photonic Band Gap Materials: A Semiconductor for Light", Department of Physics, University of Toronto, p. 1-23; 2001.
(Continued)

*Primary Examiner* — Audrey Y Chang
(74) *Attorney, Agent, or Firm* — Dinsmore & Shohl LLP

(57) ABSTRACT

A non-dichroic omnidirectional structural color multilayer structure. The non-dichroic omnidirectional structural color multilayer structure has an absorbing layer, a first layer extending across the absorbing layer, and a second layer extending across the first layer. The multilayer structure can reflect a narrow band of electromagnetic radiation that has a width of less than 500 nanometers and a center wavelength shift of less than 200 nanometers when the multilayer structure is viewed from angles between 0 and 45 degrees. In addition, the absorbing layer can block electromagnetic radiation reflected off of a surface that is proximate to the multilayer structure and thereby afford for a "pure" color that is not contaminated by reflected light from surrounding surfaces.

15 Claims, 18 Drawing Sheets

Related U.S. Application Data continuation-in-part of application No. 13/572,071, filed on Aug. 10, 2012, which is a continuation-in-part of application No. 13/021,730, filed on Feb. 5, 2011, now Pat. No. 9,063,291, which is a continuation-in-part of application No. 12/793,772, filed on Jun. 4, 2010, now Pat. No. 8,736,959, which is a continuation-in-part of application No. 12/388,395, filed on Feb. 18, 2009, now Pat. No. 8,749,881, which is a continuation-in-part of application No. 11/837,529, filed on Aug. 12, 2007, now Pat. No. 7,903,339, said application No. 13/021,730 is a continuation-in-part of application No. 11/837,529, filed on Aug. 12, 2007, now Pat. No. 7,903,339, application No. 13/760,699, which is a continuation-in-part of application No. 12/467,656, filed on May 18, 2009, now Pat. No. 8,446,666.

(51) Int. Cl.
 *G02B 5/26* (2006.01)
 *G02B 5/00* (2006.01)
 *B05D 5/06* (2006.01)
 *G02B 5/08* (2006.01)

(58) Field of Classification Search
 USPC .............................. 359/584, 585, 586, 588
 See application file for complete search history.

(56) References Cited

U.S. PATENT DOCUMENTS

| | | |
|---|---|---|
| 3,769,515 A | 10/1973 | Clark, Jr. |
| 3,885,408 A | 5/1975 | Clark, Jr. |
| 3,910,681 A | 10/1975 | Elliott et al. |
| 3,953,643 A | 4/1976 | Cheung et al. |
| 4,079,605 A | 3/1978 | Bartels |
| 4,449,126 A | 5/1984 | Pekker |
| 4,525,028 A | 6/1985 | Dorschner |
| 4,544,415 A | 10/1985 | Franz et al. |
| 4,556,599 A | 12/1985 | Sato et al. |
| 4,613,622 A | 9/1986 | Moeller et al. |
| 4,643,518 A | 2/1987 | Taniguchi |
| 4,673,914 A | 6/1987 | Lee |
| 4,705,839 A | 11/1987 | Martin |
| 4,714,308 A | 12/1987 | Sawamura et al. |
| 4,753,829 A | 6/1988 | Panush |
| 4,756,602 A | 7/1988 | Southwell et al. |
| 4,868,559 A | 9/1989 | Pinnow |
| 4,896,928 A | 1/1990 | Perilloux et al. |
| 4,996,105 A | 2/1991 | Oyama et al. |
| 5,007,710 A | 4/1991 | Nakajima et al. |
| 5,043,593 A | 8/1991 | Tsutsumi et al. |
| RE33,729 E | 10/1991 | Perilloux |
| 5,132,661 A | 7/1992 | Pinnow |
| 5,138,468 A | 8/1992 | Barbanell |
| 5,183,700 A | 2/1993 | Austin |
| 5,214,530 A | 5/1993 | Coombs et al. |
| 5,245,329 A | 9/1993 | Gokcebay |
| 5,279,657 A | 1/1994 | Phillips et al. |
| 5,283,431 A | 2/1994 | Rhine |
| 5,323,416 A | 6/1994 | Bhat et al. |
| 5,410,431 A | 4/1995 | Southwell |
| 5,423,912 A | 6/1995 | Sullivan et al. |
| 5,424,119 A | 6/1995 | Phillips et al. |
| 5,437,931 A | 8/1995 | Tsai et al. |
| 5,472,798 A | 12/1995 | Kumazawa et al. |
| 5,491,470 A | 2/1996 | Veligdan |
| 5,543,665 A | 8/1996 | Demarco |
| 5,561,420 A | 10/1996 | Kleefeldt et al. |
| 5,569,332 A | 10/1996 | Glatfelter et al. |
| 5,569,353 A | 10/1996 | Zodrow |
| 5,569,535 A | 10/1996 | Phillips et al. |
| 5,570,847 A | 11/1996 | Phillips et al. |
| 5,571,624 A | 11/1996 | Phillips et al. |
| 5,653,792 A | 8/1997 | Phillips et al. |
| 5,691,844 A | 11/1997 | Oguchi et al. |
| 5,700,550 A | 12/1997 | Uyama et al. |
| 5,759,255 A | 6/1998 | Venturini et al. |
| 5,768,026 A | 6/1998 | Kiyomoto et al. |
| 5,850,309 A | 12/1998 | Shirai et al. |
| 5,889,603 A | 3/1999 | Roddy et al. |
| 5,982,078 A | 11/1999 | Krisl et al. |
| 6,049,419 A | 4/2000 | Wheatley et al. |
| 6,055,079 A | 4/2000 | Hagans et al. |
| 6,130,780 A | 10/2000 | Joannopoulos et al. |
| 6,150,022 A | 11/2000 | Coulter et al. |
| 6,156,115 A | 12/2000 | Pfaff et al. |
| 6,157,480 A | 12/2000 | Anderson et al. |
| 6,157,489 A | 12/2000 | Bradley, Jr. et al. |
| 6,157,498 A | 12/2000 | Takahashi |
| 6,180,025 B1 | 1/2001 | Schoenfeld et al. |
| 6,215,592 B1 | 4/2001 | Pelekhaty |
| 6,242,056 B1 | 6/2001 | Spencer et al. |
| 6,243,204 B1 | 6/2001 | Bradley, Jr. et al. |
| 6,246,523 B1 | 6/2001 | Bradley, Jr. et al. |
| 6,249,378 B1 | 6/2001 | Shimamura et al. |
| 6,310,905 B1 | 10/2001 | Shirai |
| 6,331,914 B1 | 12/2001 | Wood, II et al. |
| 6,383,638 B1 | 5/2002 | Coulter et al. |
| 6,387,457 B1 | 5/2002 | Jiang et al. |
| 6,387,498 B1 | 5/2002 | Coulter et al. |
| 6,399,228 B1 | 6/2002 | Simpson |
| 6,433,931 B1 | 8/2002 | Fink et al. |
| 6,451,414 B1 | 9/2002 | Wheatley et al. |
| 6,475,273 B1 | 11/2002 | Zimmermann et al. |
| 6,534,903 B1 | 3/2003 | Spiro et al. |
| 6,565,770 B1 * | 5/2003 | Mayer ............. B82Y 10/00 106/403 |
| 6,569,527 B1 | 5/2003 | Calhoun et al. |
| 6,574,383 B1 | 6/2003 | Erchak et al. |
| 6,582,764 B2 | 6/2003 | Fuller et al. |
| 6,596,070 B1 | 7/2003 | Schmidt et al. |
| 6,618,149 B1 | 9/2003 | Stirton |
| 6,624,945 B2 | 9/2003 | Fan et al. |
| 6,667,095 B2 | 12/2003 | Wheatley et al. |
| 6,686,042 B1 | 2/2004 | LeGallee |
| 6,699,313 B2 | 3/2004 | Coulter et al. |
| 6,753,952 B1 * | 6/2004 | Lawrence ............. G07D 7/06 356/71 |
| 6,841,238 B2 | 1/2005 | Argoitia et al. |
| 6,844,976 B1 | 1/2005 | Firon et al. |
| 6,873,393 B2 | 3/2005 | Ma |
| 6,887,526 B1 | 5/2005 | Mt et al. |
| 6,894,838 B2 | 5/2005 | Mizrahi et al. |
| 6,903,873 B1 | 6/2005 | Joannopoulos et al. |
| 6,913,793 B2 | 7/2005 | Jiang et al. |
| 6,927,900 B2 | 8/2005 | Liu et al. |
| 6,997,981 B1 | 2/2006 | Coombs et al. |
| 7,049,003 B2 | 5/2006 | Thomsen et al. |
| 7,052,762 B2 | 5/2006 | Hebrink et al. |
| 7,064,897 B2 | 6/2006 | Hebrink et al. |
| 7,098,257 B2 | 8/2006 | Rink et al. |
| 7,106,516 B2 | 9/2006 | Lotz et al. |
| 7,123,416 B1 | 10/2006 | Erdogan et al. |
| 7,141,297 B2 | 11/2006 | Condo et al. |
| 7,169,472 B2 | 1/2007 | Raksha et al. |
| 7,184,133 B2 | 2/2007 | Coombs et al. |
| 7,190,524 B2 | 3/2007 | Grawert et al. |
| 7,215,473 B2 | 5/2007 | Fleming |
| 7,236,296 B2 | 6/2007 | Liu et al. |
| 7,267,386 B2 | 9/2007 | Hesch |
| 7,326,967 B2 | 2/2008 | Hsieh et al. |
| 7,329,967 B2 | 2/2008 | Nozawa et al. |
| 7,352,118 B2 | 4/2008 | Chowdhury et al. |
| 7,367,691 B2 | 5/2008 | Lin |
| 7,410,685 B2 | 8/2008 | Rosenberger et al. |
| 7,413,599 B2 | 8/2008 | Henglein et al. |
| 7,446,142 B2 | 11/2008 | Meisenburg et al. |
| 7,452,597 B2 | 11/2008 | Bujard |
| 7,483,212 B2 | 1/2009 | Cho et al. |
| 7,638,184 B2 | 12/2009 | Yaoita et al. |
| 7,667,895 B2 | 2/2010 | Argoitia et al. |

(56) References Cited

U.S. PATENT DOCUMENTS

| | | | |
|---|---|---|---|
| 7,699,350 B2 | 4/2010 | Heim | |
| 7,699,927 B2 | 4/2010 | Henglein et al. | |
| 7,745,312 B2 | 6/2010 | Herner et al. | |
| 7,847,342 B2 | 12/2010 | Fukuzumi et al. | |
| 7,851,580 B2 | 12/2010 | Li et al. | |
| 7,859,754 B2 | 12/2010 | Falicoff | |
| 7,863,672 B2 | 1/2011 | Jin et al. | |
| 7,903,339 B2 * | 3/2011 | Banerjee | G02B 5/26 359/584 |
| 7,929,730 B2 | 4/2011 | Huang et al. | |
| 7,980,711 B2 | 7/2011 | Takayanagi et al. | |
| 8,013,383 B2 | 9/2011 | Kidoh et al. | |
| 8,257,784 B2 | 9/2012 | Grayson et al. | |
| 8,313,798 B2 | 11/2012 | Nogueira et al. | |
| 8,323,391 B2 | 12/2012 | Banerjee et al. | |
| 8,329,247 B2 | 12/2012 | Banerjee et al. | |
| 8,350,314 B2 | 1/2013 | Fukuzumi et al. | |
| 8,440,014 B2 | 5/2013 | Kitamura et al. | |
| 8,446,666 B2 | 5/2013 | Kurt et al. | |
| 8,593,728 B2 | 11/2013 | Banerjee et al. | |
| 8,599,464 B2 | 12/2013 | Park | |
| 8,619,365 B2 | 12/2013 | Harris et al. | |
| 8,736,959 B2 * | 5/2014 | Grayson | G02B 5/0825 359/584 |
| 9,063,291 B2 * | 6/2015 | Banerjee | G02B 5/085 |
| 9,739,917 B2 * | 8/2017 | Banerjee | G02B 5/285 |
| 2001/0022151 A1 | 9/2001 | Sliwinski et al. | |
| 2002/0030882 A1 | 3/2002 | Vitt et al. | |
| 2002/0096087 A1 | 7/2002 | Glausch | |
| 2002/0117080 A1 | 8/2002 | Okutsu et al. | |
| 2002/0129739 A1 | 9/2002 | Yanagimoto et al. | |
| 2003/0002157 A1 | 1/2003 | Someno | |
| 2003/0059549 A1 | 3/2003 | Morrow et al. | |
| 2003/0190473 A1 | 10/2003 | Argoitia et al. | |
| 2004/0047055 A1 | 3/2004 | Mizrahi et al. | |
| 2004/0156984 A1 | 8/2004 | Vitt et al. | |
| 2004/0179267 A1 | 9/2004 | Moon et al. | |
| 2004/0191540 A1 | 9/2004 | Jakobi et al. | |
| 2004/0246477 A1 | 12/2004 | Moon et al. | |
| 2004/0252509 A1 | 12/2004 | Lin | |
| 2004/0263983 A1 | 12/2004 | Acree | |
| 2004/0265477 A1 | 12/2004 | Nabatova-Gabain et al. | |
| 2005/0126441 A1 | 6/2005 | Skelhorn | |
| 2005/0127840 A1 | 6/2005 | Chowdhury et al. | |
| 2005/0132929 A1 | 6/2005 | Raksha et al. | |
| 2005/0152417 A1 | 7/2005 | Lin | |
| 2005/0235714 A1 | 10/2005 | Lindstrom | |
| 2005/0264874 A1 | 12/2005 | Lin | |
| 2006/0006402 A1 | 1/2006 | Hsieh et al. | |
| 2006/0030656 A1 | 2/2006 | Tarng et al. | |
| 2006/0081858 A1 | 4/2006 | Lin et al. | |
| 2006/0145172 A1 | 7/2006 | Su et al. | |
| 2006/0155007 A1 | 7/2006 | Huber | |
| 2006/0159922 A1 | 7/2006 | O'Keefe | |
| 2006/0222592 A1 | 10/2006 | Burda | |
| 2007/0097509 A1 | 5/2007 | Nevitt et al. | |
| 2007/0221097 A1 | 9/2007 | Tarng et al. | |
| 2009/0046368 A1 | 2/2009 | Banerjee et al. | |
| 2009/0082659 A1 | 3/2009 | Ham et al. | |
| 2009/0153953 A1 | 6/2009 | Banerjee et al. | |
| 2009/0161220 A1 | 6/2009 | Banerjee et al. | |
| 2009/0241802 A1 | 10/2009 | Nemoto et al. | |
| 2009/0303044 A1 | 12/2009 | Furuichi et al. | |
| 2009/0321693 A1 | 12/2009 | Ohkuma et al. | |
| 2010/0064938 A1 | 3/2010 | Voit et al. | |
| 2010/0208338 A1 | 8/2010 | Banerjee et al. | |
| 2010/0209593 A1 | 8/2010 | Banerjee et al. | |
| 2010/0213485 A1 | 8/2010 | McKenzie et al. | |
| 2011/0014366 A1 | 1/2011 | Nogueira et al. | |
| 2011/0091658 A1 | 4/2011 | Banerjee et al. | |
| 2011/0113984 A1 | 5/2011 | Fuller, Jr. et al. | |
| 2011/0128616 A1 | 6/2011 | Banerjee et al. | |
| 2011/0134515 A1 | 6/2011 | Banerjee et al. | |
| 2011/0228399 A1 | 9/2011 | Ohnishi | |
| 2011/0266879 A1 | 11/2011 | Kim et al. | |
| 2011/0267247 A1 | 11/2011 | Choi et al. | |
| 2011/0299154 A1 | 12/2011 | Grayson et al. | |
| 2012/0015056 A1 | 1/2012 | Lee | |
| 2012/0050848 A1 | 3/2012 | Carlson et al. | |
| 2012/0107584 A1 | 5/2012 | Eibon et al. | |
| 2012/0153527 A1 | 6/2012 | Banerjee et al. | |
| 2012/0307369 A1 | 12/2012 | Banerjee et al. | |
| 2013/0148221 A1 | 6/2013 | Banerjee et al. | |
| 2013/0213260 A1 | 8/2013 | Kunii | |
| 2013/0250403 A1 | 9/2013 | Maeda | |
| 2013/0265668 A1 | 10/2013 | Banerjee et al. | |
| 2014/0018439 A1 | 1/2014 | Gruner et al. | |
| 2014/0111861 A1 | 4/2014 | Banerjee et al. | |
| 2014/0211303 A1 | 7/2014 | Banerjee et al. | |
| 2014/0368918 A1 | 12/2014 | Banerjee et al. | |
| 2015/0033988 A1 | 2/2015 | Wu et al. | |
| 2015/0138642 A1 | 5/2015 | Banerjee et al. | |
| 2015/0309231 A1 | 10/2015 | Banerjee | |
| 2015/0309232 A1 | 10/2015 | Banerjee | |

FOREIGN PATENT DOCUMENTS

| | | |
|---|---|---|
| DE | 2106613 A1 | 8/1971 |
| EP | 141143 B1 | 5/1985 |
| JP | 07034324 | 2/1995 |
| JP | 2000220331 A | 8/2000 |
| JP | 2000329933 A | 11/2000 |
| JP | 2005144925 A | 6/2005 |
| JP | 2006506518 A | 2/2006 |
| JP | 2006097426 A | 4/2006 |
| JP | 2008038382 A | 2/2008 |
| WO | 99/42892 A1 | 8/1999 |
| WO | 2000/022466 A1 | 4/2000 |
| WO | 0031571 A1 | 6/2000 |
| WO | 02054030 A2 | 7/2002 |
| WO | 03062871 A1 | 7/2003 |

OTHER PUBLICATIONS

Distributed Bragg Reflector; en.wikipedia.org/wiki/Distributed_Bragg_reflector (2005).

Photonic Crystal; en.wikipedia.org/wiki/Photonic_crystals (2003).

Tikhonravov, et al., "Application of the Needle Optimization Technique to the Design of Optical Coatings", Applied Optics, Optical Society of America, 1996, pp. 5493-5508, vol. 35, No. 28.

Deopura, M. et al., "Dielectric Omnidirectional Visible Reflector." Optical Society of America; vol. 26, No. 15; Department of Material Science and Engineering, Massachusetts Institute of Technology; pp. 1197-1199; Aug. 1, 2001.

Bing-Xin Wei et al., "Detrimental Thixotropic Thinning of Filter Cake of SiO2-Al2O3 Composite Coated TiO2 Particles and Its Control", Industrial & Engineering Chemistry Research, Sep. 27, 2011, 50, pp. 13799-13804.

Tikhonravov, Alexander V. et al., "Optical Coating Design Algorithm Based on the Equivalent Layers Theory", Applied Optics: vol. 45, No. 7; Mar. 2006; pp. 1530-1538.

Kaminska, Kate et al., "Birefringent Omnidirectional Reflector", Applied Optics, vol. 43, No. 7, Mar. 2004, pp. 1570-1576.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

"Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010".

Bendiganavale A.K., Malshe, V.C., "Infrared Reflective Inorganic Pigments", Recent Patents on Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

Nixon, J., "Twinkle, Twinkle Little Star," Asia Pacific Coatings Journal, Feb. 20-24, 2004.

Maier, E.J. "To Deal With the Invisible: On the biological significance of ultraviolet sensitivity in birds." Naturwissenschaften 80: 476-478, 1993.

(56) References Cited

OTHER PUBLICATIONS

Lin, Weihua et al., "Design and Fabrication of Omnidirectional Reflectors in the Visible Range" Journal of Modern Optics, vol. 52, No. 8, 1155-1160, (May 20, 2005).

Chen, Kevin M. et al., "SiO2/TiO2 Omnidirectional Reflector and Microcavity Resonator via the Sol-Gel Method", Appl. Phys. Lett., vol. 75, No. 24, Dec. 13, 1999.

Decorby, R.G. et al., "Planar Omnidirectional Reflectors in Chalcogenide Glass and Polymer" Optics Express, vol. 13, No. 16, 6228-6233, Aug. 8, 2005.

Clement, T.J. et al., "Improved Omnidirectional Reflectors in Chalcogenide Glass and Polymer by Using the Silver Doping Tachnique", Optics Express, vol. 14, No. 5, 1789-1796 (Mar. 6, 2006).

Bruyant, A. et al., "All-Silicon Omnidirectional Mirrors Based on One-Dimensional Photonic Crystals", Appl. Phys. Lett. vol. 82, No. 19, May 12, 2003.

Chigrin, D.N. et al., "Observation of Total Omnidirectional Reflection From a One-Dimensional Dielectric Lattice", Appl. Phys. A. 68, 25-28 (1999).

Park, Y. et al., "GaAs-based Near-infrared Omnidirectional Reflector", Appl. Phys. Lett., vol. 82, No. 17, 2770-2772, Apr. 28, 2003.

Fink, Yoel et al., "A Dielectric Omnidirectional Reflector", Science, vol. 282, 1679-1682, Nov. 27, 1998.

Lee, H.Y. et al., "Design and Evaluation of Omnidirectional One-Dimensional Photonic Crystals", Journal of Appl. Phys. vol. 93, No. 2, Jan. 15, 2003.

Hongqiang et al, "Disordered dielectric high reflectors with broadband from visible to infrared," Applied Physics Letters, American Institute of Physics, Melville, NY, US, vol. 74, No. 22, 1999.

Banerjee, D. et al., "Narrow-band Omnidirectional Structural Color", SAE World Congress 01-1049 (2008).

Almeida, R.M. et al., "Photonic Bandgap Materials and Structures by Sol-Gel Processing", Journal of Non-Crystalline Solids 326 &327, 405-409 (2003).

Schmid, Raimund and Mronga, Norbert, "A New Generation of Sparkling Effect Pigments", Paint & Coatings Industry; Oct. 2004, vol. 20 Issue 10, p. 118-121.

\* cited by examiner

NON-DICHROIC OMNIDIRECTIONAL STRUCTURAL COLOR

CROSS-REFERENCE TO RELATED APPLICATIONS

This application claims priority to and is a continuation of U.S. patent application Ser. No. 13/760,699 filed Feb. 6, 2013, which in turn is a continuation-in-part of U.S. patent application Ser. No. 13/572,071 filed Aug. 10, 2012, which in turn is a continuation-in-part of and claims priority to U.S. patent application Ser. No. 13/021,730 filed Feb. 5, 2011 (now U.S. Pat. No. 9,063,291), which in turn is a continuation-in-part of and claims priority to Ser. No. 12/793,772 filed Jun. 4, 2010 (now U.S. Pat. No. 8,736,959), which in turn is a continuation-in-part of and claims priority to Ser. No. 12/388,395 filed Feb. 18, 2009 (now U.S. Pat. No. 8,749,881), which in turn is a continuation-in-part of and claims priority to Ser. No. 11/837,529 filed Aug. 12, 2007 (U.S. Pat. No. 7,903,339); and said Ser. No. 13/021,730 filed Feb. 5, 2011 is a continuation-in-part of and claims priority to Ser. No. 11/837,529 filed Aug. 12, 2007 (U.S. Pat. No. 7,903,339); and said Ser. No. 13/760,699 filed Feb. 6, 2013 is a continuation-in-part of and claims priority to Ser. No. 12/467,656 filed May 18, 2009 (U.S. Pat. No. 8,446,666), all of which are incorporated herein in their entirety by reference.

FIELD OF THE INVENTION

The present invention relates to an omnidirectional structural color and, in particular, to an omnidirectional structural color in the form of a multilayer stack with an absorbing layer.

BACKGROUND OF THE INVENTION

Structural colors can be made from dielectric layers and provide "brilliant" looking coatings, paints, etc. However, structural colors can also suffer from dichroic behavior, i.e. the dielectric layers can act as a color filter and two colors can appear from such a structure, one from reflectance and another from transmission. Such a property can pose a problem since the dichroism can result in the "leaking" of a background layer, e.g. a primer layer, and as such, a black background or primer is required if a single structural color appearance is desired. Therefore, a structural color that can absorb or reflect incident electromagnetic radiation and prevent dichroic behavior would be desirable.

SUMMARY OF THE INVENTION

A non-dichroic omnidirectional structural color is provided. The non-dichroic omnidirectional structural color can include a multilayer stack that has an absorbing layer, a first layer extending across the absorbing layer, and a second layer extending across the first layer. The first layer can be made from a first material that has a first index of refraction and a first predefined thickness and the second layer can be made from a second material that has a second index of refraction and a second predefined thickness.

The multilayer stack can reflect a narrow band of electromagnetic radiation when exposed to a source of broadband electromagnetic radiation, e.g. white light, sun light, etc. The narrow band having a width of less than 500 nanometers and a center wavelength shift of less than 200 nanometers when the multilayer stack is viewed from angles between 0 and 45 degrees. In some instances, the multilayer stack can have a third layer and a fourth layer that is present on an opposite side of the absorbing layer. The third layer and the fourth layer may or may not be made from the first material and the second material, respectively. In addition, the third layer and the fourth layer may or may not have a thickness that is equal to the first predefined thickness and the second predefined thickness, respectively.

The absorbing layer can contain chromium and in some instances can be a chromium layer. Furthermore, the multilayer structure can be a paint pigment that may or may not be mixed with a binder to form a paint, the paint blocking electromagnetic radiation reflected off of a primer layer that the paint is applied to. In the event that the paint contains other additives that can reflect electromagnetic radiation, the paint pigment can block such reflected electromagnetic radiation. In this manner, the multilayer stack can provide a "pure" color that is not contaminated by electromagnetic radiation that is reflected off of an underlying primer, additives within a binder, and the like.

In some instances, the narrow band of reflected electromagnetic radiation is less than 250 nanometers and the center wavelength shift is less than 150 nanometers when the multilayer structure is viewed from angles between 0 and 45 degrees. In other instances, the narrow band of reflected electromagnetic radiation has a width of less than 200 nanometers and the center wavelength shift is less than 100 nanometers when viewed from angles between 0 and 45 degrees. In still other instances, the above stated properties can be provided when the multilayer structure is viewed from angles between 0 to 50, 0 to 60 and/or 0 to 70 degrees.

The absorbing layer, first layer, and second layer can be located on a substrate and may or may not be located on both sides of a substrate that is generally planar. In addition, the substrate can be a particle that is coated with the absorbing layer, first layer, and second layer. It is appreciated that more than two layers can be present and the multilayer structure may or may not be a quarter wave design. Stated differently, the multilayer structure/stack with the absorbing layer has at least two layers that may or may not have thicknesses in accordance with a quarter wave design, so long as the multilayer structure reflects a narrow band of electromagnetic radiation with a width of less than 500, 250 or 200 nanometers and has a narrow band center wavelength shift of less than 200, 150 or 100 nanometers when the stack is viewed from angles between 0 and 45, 0 to 50, 0 to 60, or 0 to 70 degrees.

DETAILED DESCRIPTION OF THE INVENTION

Figure 1:
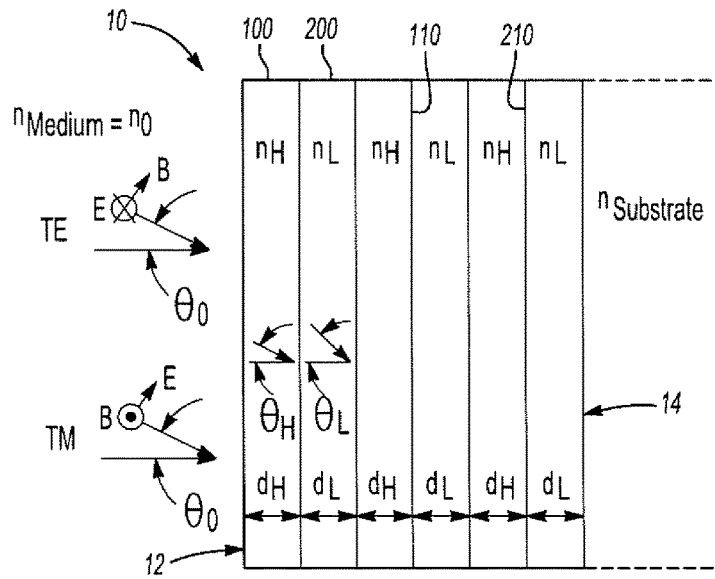
FIG. 1 is a schematic diagram of a multilayer structure according to an embodiment of the present invention.

The present invention provides an omnidirectional structural color multilayer structure that blocks light reflected from an underlying layer and/or additives, particles, and the like that are present in the proximity thereof. As such, the omnidirectional structural color multilayer structure has use as a paint pigment.

The omnidirectional structural color multilayer structure can have an absorbing layer, a first layer made from a first material extending across the absorbing layer, and a second layer made from a second material extending across the first layer. The first layer can have a first predefined thickness and the first material can have a first index of refraction. The second layer can have a second predefined thickness and the second material can have a second index of refraction. The at least two layers extending across the absorbing layer can reflect a narrow band of electromagnetic radiation when exposed to a source of broadband electromagnetic radiation, the narrow band having a width of less than 500, 250 or 200 nanometers and a center wavelength shift of less than 200, 150 or 100 nanometers when the multilayer structure is viewed from angles between 0 and 45, 0 to 50, 0 to 60, or 0 to 70 degrees. In addition, the multilayer structure can have a quantity defined as a range to mid-range ratio of less than 2%.

The absorbing layer can block electromagnetic radiation reflected off of a surface that is proximate to the multilayer structure. It is appreciated that the blocking of the electromagnetic radiation from the surface that is proximate to the multilayer structure can afford in the decrease or elimination of "leaking or "bleed through" of a color(s) from a surface(s) that is(are) are proximate to the multilayer structure. For example, the multilayer structure can be in the form of a paint pigment, and the paint pigment can block light that has been reflected off of an underlying primer layer that the paint has been applied to. In this manner, an underlying primer layer does not have to be a particular color, e.g. black, and the suppression or blocking of color(s) from additional additives within the paint can be provided. As such, the multilayer structure affords for a greater variety of additives, primer colors, and the like to be used in combination with paint.

The absorbing layer can have two or more dielectric layers extending there across with a first layer extending and in direct contact with the absorbing layer and a second layer extending and in direct contact with the first layer. In some instances, the absorbing layer has two sides with at least two dielectric layers extending across both sides. In other instances, the absorbing layer can be in the form of a particle which is coated by the at least two dielectric layers. In still yet other instances, a substrate in the form of a particle can be coated by the absorbing layer and the at least two dielectric layers.

The absorbing layer can be made from any material known to those skilled in the art that defines at least 0-70% transparent of incident electromagnetic radiation of either all or certain frequency of light. Suitable materials for such an absorbing layer can be semi-opaque or opaque material such as chromium, nickel, carbon, graphite, graphene, titanium, vanadium, aluminum, cobalt, silver, molybdenum, niobium, iron, stainless steel, tungsten and various combinations of alloys of these materials such as Ni—Cr or Ni—Cr—Fe. Absorber materials also can be visually dark oxides like biotite, doped mica, doped aluminum oxide, other metal colored metal oxide such as aluminum oxide, neodymium oxide, tungsten oxide, iron oxide etc. and combinations thereof.

Regarding the at least two dielectric layers, the first layer can have a refractive index between 2 and 4 and the second layer can have a refractive index between 1 and 3. In addition, the first layer and the second layer can have a refractive index contrast between 0.2 and 1.0. In some instances, the first layer can have a refractive index between 2 and 2.5 while the second layer can have a refractive index between 1.8 and 2.2.

The multilayer structure can be in the form of a pigment, i.e. a plurality of particles that can be mixed with a binder, solvent, and the like to produce a paint that can be applied to a surface with a brush or by spraying. The solvent can be any solvent composition known to those skilled in the art, illustratively including organic solvents or water. For example, organic solvents such as aliphatics, aromatics, alcohols, ketones, white spirit, petroleum distillates, esters, glycol ethers, and the like can be used. Additives can be included within the paint composition, for example surface tension modifiers, flow modifiers, surface finish modifiers, wet edge modifiers, pigment stability modifiers, antifreeze modifiers, foam control modifiers, catalysts, thickeners, stabilizers, emulsifiers, texture modifiers, adhesion modifiers, flatteners, biocides, and the like.

In some instances, a nonstructural color pigment can also be included and dispersed throughout the binder along with the omnidirectional structural color pigment. The omnidirectional structural color pigment can make up between 1 and 20 percent of the overall composition, however this is not required. In addition, the paint can be a base coat of a two-stage paint or in the alternative the paint can be a base coat of a self-stratifying paint. It is appreciated that the paint can be applied on top of a primer layer that is used to coat and protect materials such as steels, galvanized steels, galvaluminized steels, aluminum, aluminum alloys, plastics, and the like.

A process for producing a component having an omnidirectional structural color appearance is also disclosed, the process including providing a component to be painted and providing a paint having a reflection band of less than 500, 250 or 200 nanometers, a reflection band center wavelength of less than 200, 150 or 100 nanometers, when a layer of the paint is viewed from angles between 0 and 45 degrees. The component can have a primer layer that does not have a color of black and the omnidirectional structural color paint can be applied on top of the primer layer and allowed to dry and/or cure. The painted component has an omnidirectional structural color appearance with a reflection band of less than 200 nanometers when viewed from an angle of between 0 and 45 degrees and a shift in the center wavelength of the reflection band of less than 200 nanometers when viewed from these angles. The paint having the multilayer structure that includes the absorbing layer prevents light reflected from the primer layer to alter or distort the color of the paint pigment.

In order to better teach and disclose the present invention, discussion of omnidirectional structural color multilayer stacks is provided below, followed by one or more examples.

The multilayer structure can have a periodic layered structure or a non-periodic layered structure. FIG. 1 illustrates a multilayer structure 10 having alternating layers of a first material 100 with a high refractive index ($n_H$) and a thickness ($d_H$), and a second material 200 with a low refractive index ($n_L$) and a thickness ($d_L$). The first material 100 includes an outer surface 110 that can extend across an outer surface 210 of the second material 200. In some instances, the multilayer structure 10 has two layers, or in the alternative more than two layers.

An electromagnetic wave consisting of perpendicular electric (E) and magnetic (M) vector components is shown incident to the multilayer structure at an incident angle $\theta_0$. The electromagnetic wave can be distinguished into two independent electromagnetic modes: a transverse electric (TE) mode and a transverse magnetic (TM) mode. The refractive index of the medium beyond the multilayer structure 10 at a first end 12 is $n_0$. For example, when the medium is air, $n_0=1$. The refractive index of an optional substrate at a second end 14 is $n_{Substrate}$. The optional substrate can be any material compatible with the multilayer structure 10 and can assist in the manufacture, storage, shipping and/or handling of the structure. If an optional substrate is present, it may or may not be removed after the manufacture of the multilayer structure 10.

When electromagnetic radiation impacts a material surface, waves of the radiation can be reflected from or transmitted through the material. Furthermore, when electromagnetic radiation impacts the first end 12 of the multilayer structure 10 at the angle $\theta_0$, the reflected angles the electromagnetic waves make with the surface of the high and low refractive index layers are $\theta_H$ and $\theta_L$, respectively. Using Snell's law:

$$n_0 \sin\theta_0 = n_L \sin\theta_L = n_H \sin\theta_H \qquad (1)$$

the angles $\theta_H$ and $\theta_L$ can be determined if the refractive indices $n_H$ and $n_L$ are known.

Regarding omnidirectional reflectivity, a necessary but not sufficient condition for the TE mode and the TM mode of electromagnetic radiation requires the maximum angle of refraction ($\theta_{H,MAX}$) inside the first layer to be less than the Brewster angle ($\theta_B$) of the interface between the first layer and the second layer. If this condition is not satisfied, the TM mode of the electromagnetic waves will not be reflected at the second and all subsequent interfaces and thus will transmit through the structure. Using this consideration:

$$\sin\theta_{H,Max} = \frac{n_0}{n_H} \qquad (2)$$

-continued and $$\tan\theta_B = \frac{n_L}{n_H} \quad (3)$$

Thereby requiring:

$$n_0 < \frac{n_H n_L}{\sqrt{n_H^2 + n_L^2}} \quad (4)$$

In addition to the necessary condition represented by Equation 4, if electromagnetic radiation of wavelength $\lambda$ falls on a multilayer structure with an angle $\theta_0$, and the individual bi-layers of the multilayer structure have thicknesses $d_H$ and $d_L$ with respective refractive indices $n_H$ and $n_L$, the characteristic translation matrix ($F_T$) can be expressed as:

$$F_T = \frac{1}{1+\rho_T}\begin{vmatrix} e^{i\delta_L} & \rho_T e^{-i\delta_L} \\ \rho_T e^{i\delta_L} & e^{-i\delta_L} \end{vmatrix} \times \frac{1}{1-\rho_T}\begin{vmatrix} e^{i\delta_H} & \rho_T e^{-i\delta_H} \\ \rho_T e^{i\delta_H} & e^{-i\delta_H} \end{vmatrix} \quad (5)$$

which can also be expressed as:

$$F_T = \frac{1}{1-\rho_T^2}\begin{vmatrix} e^{i(\delta_L+\delta_H)} - \rho_T^2 e^{-i(\delta_H-\delta_L)} & -2i\rho_T e^{-i\delta_H}\sin\delta_L \\ 2i\rho_T e^{i\delta_H}\sin\delta_L & e^{-i(\delta_L+\delta_H)} - \rho_T^2 e^{-i(\delta_H-\delta_L)} \end{vmatrix} \quad (6)$$

and where:

$$\delta_H = \frac{2\pi}{\lambda} n_H d_H \cos\theta_H \quad (7)$$

$$\delta_L = \frac{2\pi}{\lambda} n_L d_L \cos\theta_L \quad (8)$$

$$\cos\theta_H = \sqrt{1 - \frac{n_o^2 \sin^2\theta_0}{n_H^2}} \quad (9)$$

and $$\cos\theta_L = \sqrt{1 - \frac{n_o^2 \sin^2\theta_0}{n_L^2}} \quad (10)$$

In addition, $$\rho_T = \frac{n_{HT} - n_{LT}}{n_{HT} + n_{LT}} \quad (11)$$

where $$n_{HT} = \begin{cases} \frac{n_H}{\cos\theta_H} \\ n_H \cos\theta_H \end{cases} \text{ (for } TM \text{ and } TE \text{ polarization respectively)} \quad (12)$$

and $$n_{LT} = \begin{cases} \frac{n_L}{\cos\theta_L} \\ n_L \cos\theta_L \end{cases} \text{ (for } TM \text{ and } TE \text{ polarization respectively)} \quad (13)$$

Solving $\rho_T$ explicitly for TE and TM:

$$\rho_{TM} = \frac{n_H \cos\theta_L - n_L \cos\theta_H}{n_H \cos\theta_L + n_L \cos\theta_H} \quad (14)$$

and $$\rho_{TE} = \frac{n_H \cos\theta_H - n_L \cos\theta_L}{n_H \cos\theta_H + n_L \cos\theta_L} \quad (15)$$

A viewing angle dependant band structure can be obtained from a boundary condition for the edge, also known as the bandedge, of the total reflection zone. For the purposes of the present invention, bandedge is defined as the equation for the line that separates the total reflection zone from the transmission zone for the given band structure.

A boundary condition that determines the bandedge frequencies of the high reflectance band can be given by:

$$\text{Trace } |F_T| = -1 \quad (16)$$

Thus, from equation 3:

$$\frac{\cos(\delta_H + \delta_H) - \rho_T^2 \cos(\delta_H - \delta_L)}{1 - \rho_T^2} = -1 \quad (17)$$

or expressed differently:

$$\cos^2\left(\frac{\delta_H + \delta_L}{2}\right) = \rho_T^2 \cos^2\left(\frac{\delta_H - \delta_L}{2}\right) \quad (18)$$

Combining equations 15 and 7, the following bandedge equation is obtained:

$$\cos\left(\frac{\pi L_+}{\lambda}\right) = \pm|\rho_T|\cos\left(\frac{\pi L_-}{\lambda}\right) \quad (19)$$

Where:

$$L_+ = n_H d_H \cos\theta_H + n_L d_L \cos\theta_L \quad (20)$$

and:

$$L_- = n_H d_H \cos\theta_H - n_L d_L \cos\theta_L \quad (21)$$

The + sign in the bandedge equation shown above represents the bandedge for the long wavelength ($\lambda_{long}$) and the − sign represents the bandedge for the short wavelength ($\lambda_{short}$). Recompiling equations 20 and 21:

$$\cos\left(\frac{\pi L_+}{\lambda_{long}}\right) = +|\rho_{TE}|\cos\left(\frac{\pi L_-}{\lambda_{long}}\right) \text{ and} \quad (22)$$

$$\cos\left(\frac{\pi L_+}{\lambda_{Short}}\right) = -|\rho_{TE}|\cos\left(\frac{\pi L_-}{\lambda_{Short}}\right)$$

for the TE mode, and:

$$\cos\left(\frac{\pi L_+}{\lambda_{long}}\right) = +|\rho_{TM}|\cos\left(\frac{\pi L_-}{\lambda_{long}}\right) \text{ and} \quad (23)$$

-continued $$\text{Cos}\left(\frac{\pi L_+}{\lambda_{Short}}\right) = -|\rho_{TM}|\text{Cos}\left(\frac{\pi L_-}{\lambda_{Short}}\right)$$

for the TM mode.

An approximate solution of the bandedge can be determined by the following expression:

$$L_- = n_H d_H \cos\theta_H - n_L d_L \cos\theta_L \sim 0 \quad (24)$$

This approximate solution is reasonable when considering a quarter wave design (described in greater detail below) and optical thicknesses of the alternating layers chosen to be equal to each other. In addition, relatively small differences in optical thicknesses of the alternating layers provide a cosine close to unity. Thus, equations 23 and 24 yield approximate bandedge equations:

$$\lambda_{long}(\theta_0) = \frac{\pi L_+(\theta_0)}{\text{Cos}^{-1}|\rho_{TE}(\theta_0)|} \text{ and} \quad (25)$$

$$\lambda_{Short}(\theta_0) = \frac{\pi L_+(\theta_0)}{\text{Cos}^{-1}(-|\rho_{TE}(\theta_0)|)}$$

for the TE mode and:

$$\lambda_{long}(\theta_0) = \frac{\pi L_+(\theta_0)}{\text{Cos}^{-1}|\rho_{TM}(\theta_0)|} \text{ and} \quad (26)$$

$$\lambda_{Short}(\theta_0) = \frac{\pi L_+(\theta_0)}{\text{Cos}^{-1}(-|\rho_{TM}(\theta_0)|)}$$

for the TM mode.

Values for $L_+$ and $\rho_{TM}$ as a function of incident angle can be obtained from equations 7, 8, 14, 15, 20 and 21, thereby allowing calculations for $\lambda_{long}$ and $\lambda_{short}$ in the TE and TM modes as a function of incident angle.

Figure 2:
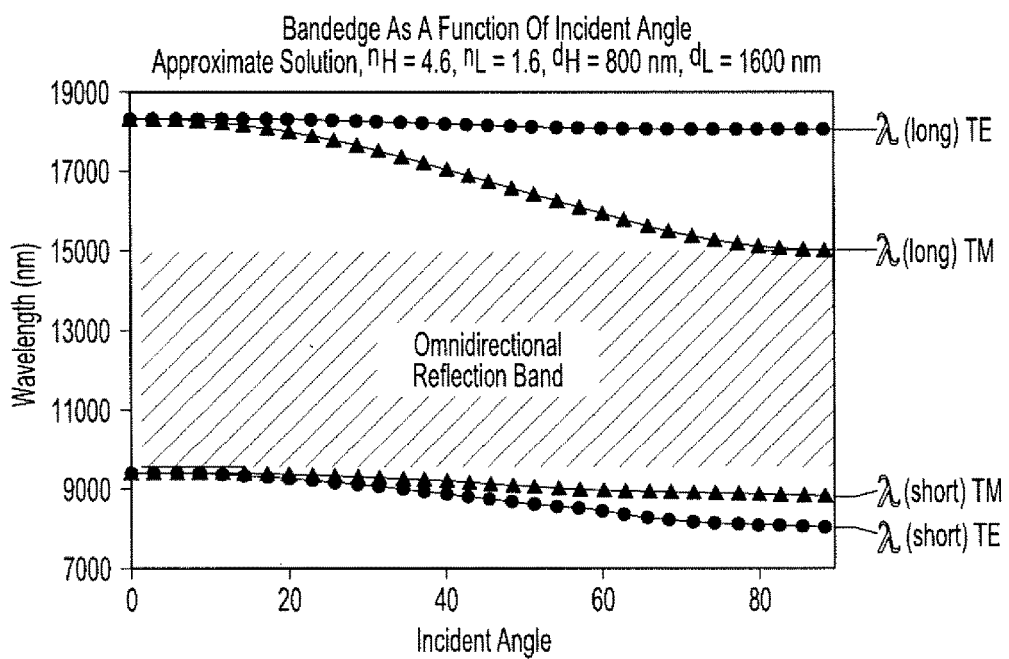
FIG. 2 is a graphical representation of bandedge as a function of incident angle.

Turning to FIG. 2, the TE and TM bandedges as a function of incident angle on a multilayer system with a first material having a high refractive index equal to 4.6 and a thickness of 800 nanometers and a second layer material with a refractive index of 1.6 and a thickness of 1600 nanometers are shown. The omnidirectional band is defined by the wavelength range where electromagnetic radiation coming from any angle will be completely reflected as shown by the highlighted box. For the example shown in FIG. 2, the omnidirectional band is in the infrared region and is approximately between the wavelengths of 9.34 microns and 15 microns. Mathematically, the omnidirectional band shown in FIG. 2 can be written as:

$$\Delta\lambda_{omni} = \lambda_{long}^{TM}(90°) - \lambda_{Short}^{TE}(0°) \quad (27)$$

Figure 3:
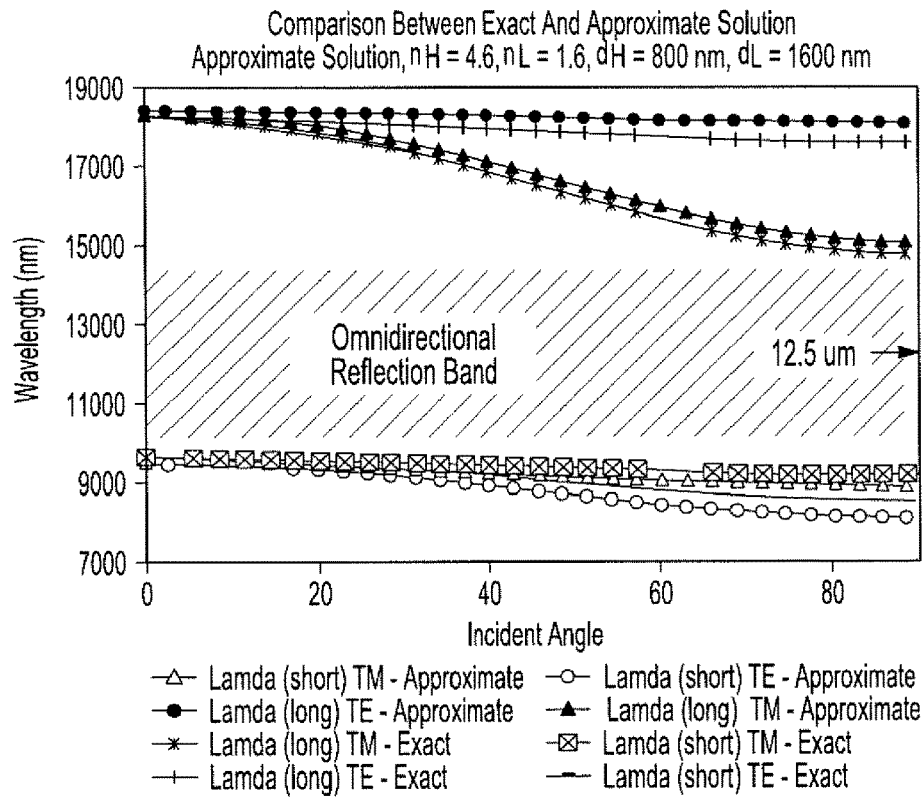
FIG. 3 is a graphical representation comparing an exact solution and an approximate solution for bandedge as a function of incident angle.

An exact solution to the bandedge equations of equation 23 and equation 24 can be represented as:

$$\lambda_{long}(\theta_0) = \frac{\pi L_+(\theta_0)}{\text{Cos}^{-1}\left|\rho_{TE}(\theta_0)\text{Cos}\left(\frac{\pi L_-}{\lambda_{Long}}\right)\right|} \quad (28)$$

and $$\lambda_{Short}(\theta_0) = \frac{\pi L_+(\theta_0)}{\text{Cos}^{-1}\left|\rho_{TE}(\theta_0)\text{Cos}\left(\frac{\pi L_-}{\lambda_{Short}}\right)\right|}$$

for the TE mode, and:

$$\lambda_{long}(\theta_0) = \frac{\pi L_+(\theta_0)}{\text{Cos}^{-1}\left|\rho_{TM}(\theta_0)\text{Cos}\left(\frac{\pi L_-}{\lambda_{Long}}\right)\right|} \quad (29)$$

and $$\lambda_{Short}(\theta_0) = \frac{\pi L_+(\theta_0)}{\text{Cos}^{-1}\left|\rho_{TM}(\theta_0)\text{Cos}\left(\frac{\pi L_-}{\lambda_{Short}}\right)\right|}$$

for the TM mode. Using numerical evaluation, a comparison between the exact and approximate solutions for the multilayer system described above is shown in FIG. 3. FIG. 3 thus demonstrates that an approximation method for the determination of the bandedge equations is reasonable and adequate.

The center wavelength of an OSC pigment ($\lambda_c$), can be determined from the relation:

$$\lambda_c = 2(n_H d_H \cos\theta_H + n_L d_L \cos\theta_L) \quad (30)$$

The center wavelength can be an important parameter since its value indicates the approximate range of electromagnetic wavelength and/or color spectrum to be reflected. For example, the multilayer system described above for normal incidence provides a center wavelength of 12.5 microns, which is consistent with the plots shown in FIGS. 2 and 3.

Figure 4A:
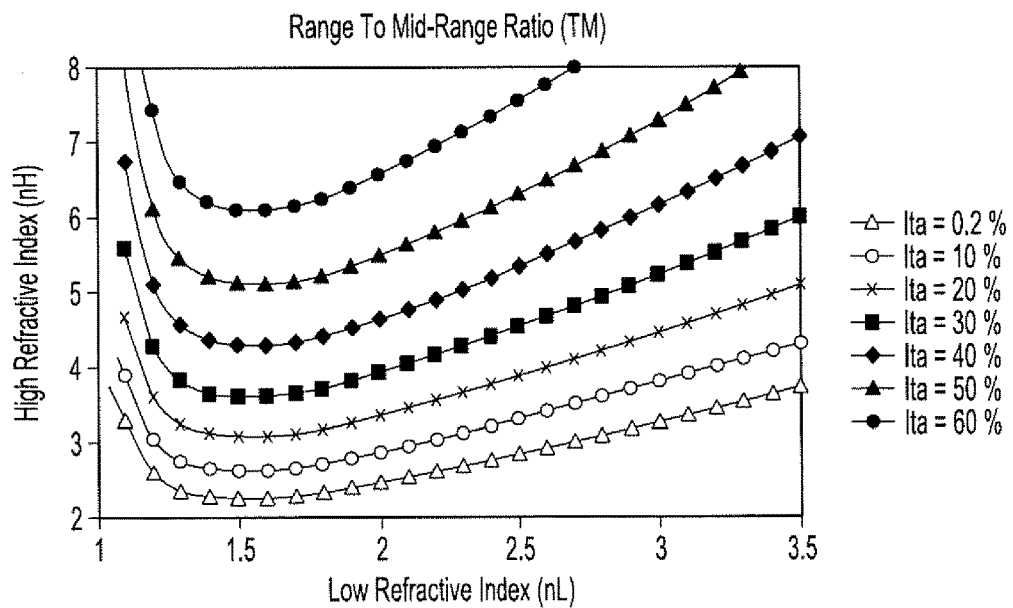
FIG. 4A is a graphical representation of range to midrange ratios for the transverse magnetic mode of electromagnetic radiation.
Figure 4B:
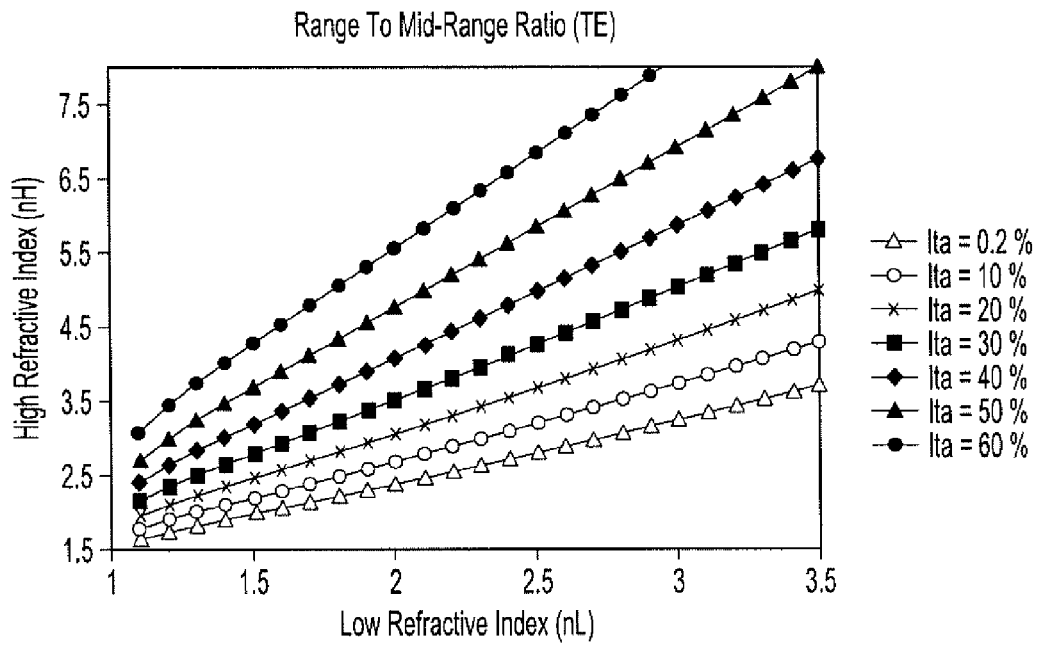
FIG. 4B is a graphical representation of range to midrange ratios for the transverse electric mode of electromagnetic radiation.

Another important parameter that can provide an indication as to the width of a reflection band is defined as the ratio of range of wavelengths within the omnidirectional reflection band to the mid-range of wavelengths within the omnidirectional reflection band. This "range to mid-range ratio" ($\eta$) is mathematically expressed as:

$$\eta_{TE} = 2\frac{\lambda_{long}^{TE}(\theta_0 = 90°) - \lambda_{Short}^{TE}(\theta_0 = 0°)}{\lambda_{long}^{TE}(\theta_0 = 90°) + \lambda_{Short}^{TE}(\theta_0 = 0°)} \quad (31)$$

for the TE mode, and:

$$\eta_{TM} = 2\frac{\lambda_{long}^{TM}(\theta_0 = 90°) - \lambda_{Short}^{TM}(\theta_0 = 0°)}{\lambda_{long}^{TM}(\theta_0 = 90°) + \lambda_{Short}^{TM}(\theta_0 = 0°)} \quad (32)$$

for the TM mode. It is appreciated that the range to mid-range ratio can be expressed as a percentage and for the purposes of the present invention, the term range to mid-range ratio and range to mid-range ratio percentage are used interchangeably. It is further appreciated that a "range to mid-range ratio" value provided herein having a "%" sign following is a percentage value of the range to mid-range ratio. The range to mid-range ratios for the TM mode and TE mode can be numerically calculated from equations 31 and 32 and plotted as a function of high refractive index and low refractive index, as illustrated in FIGS. 4A and 4B. Furthermore, once the range to mid-range ratio has been determined, corresponding reflectance as a function of wavelength can be plotted.

Figure 5A:
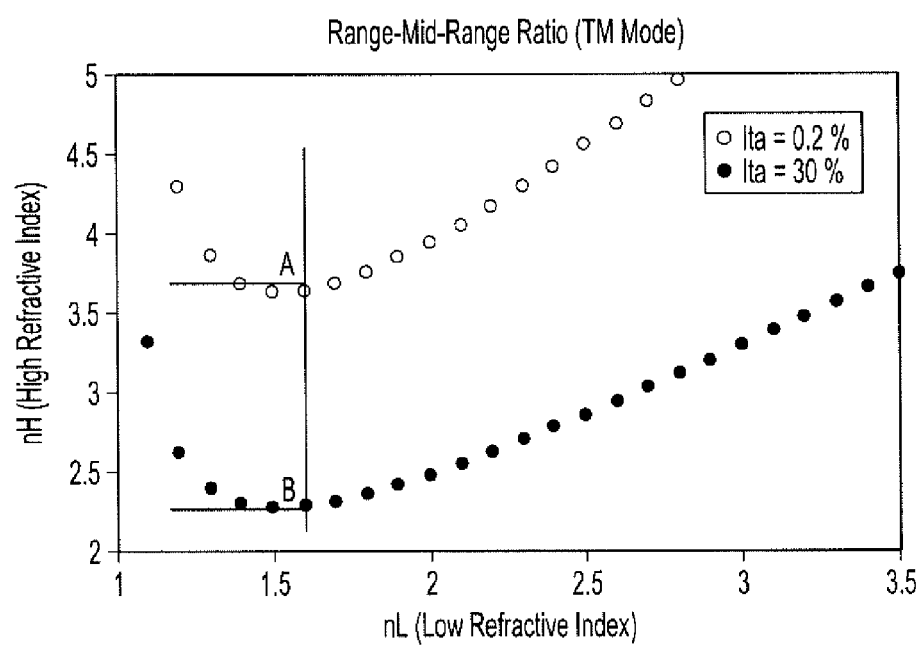
FIG. 5A is a graphical representation of range to midrange ratios equal to 30% and 0.2%.
Figure 5B:
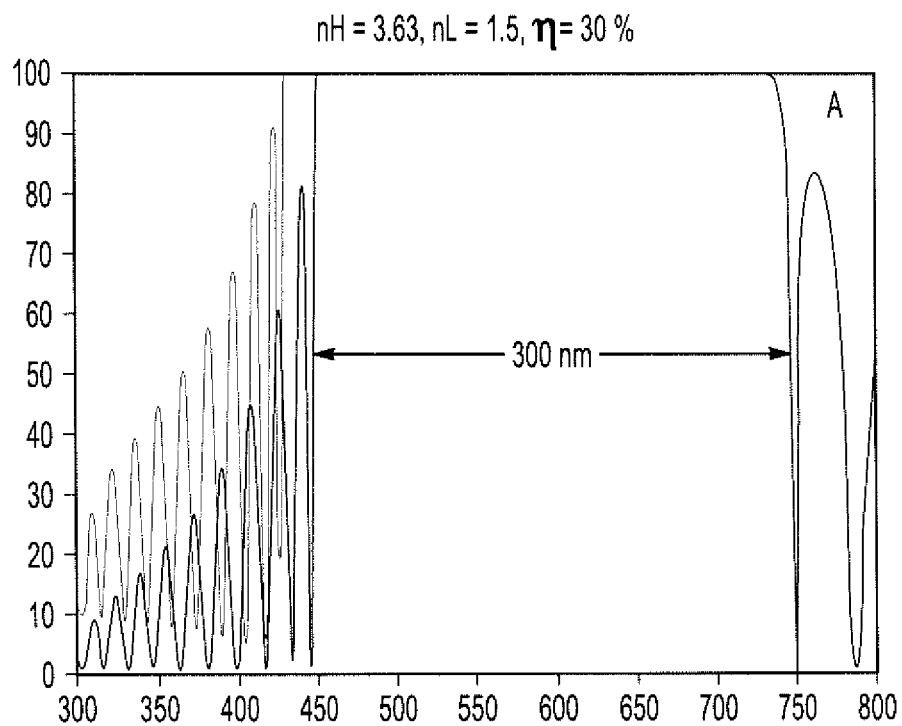
FIG. 5B is a graphical representation of corresponding reflectance spectra for the range to mid-range ratios of 30% shown in FIG. 5A.
Figure 5C:
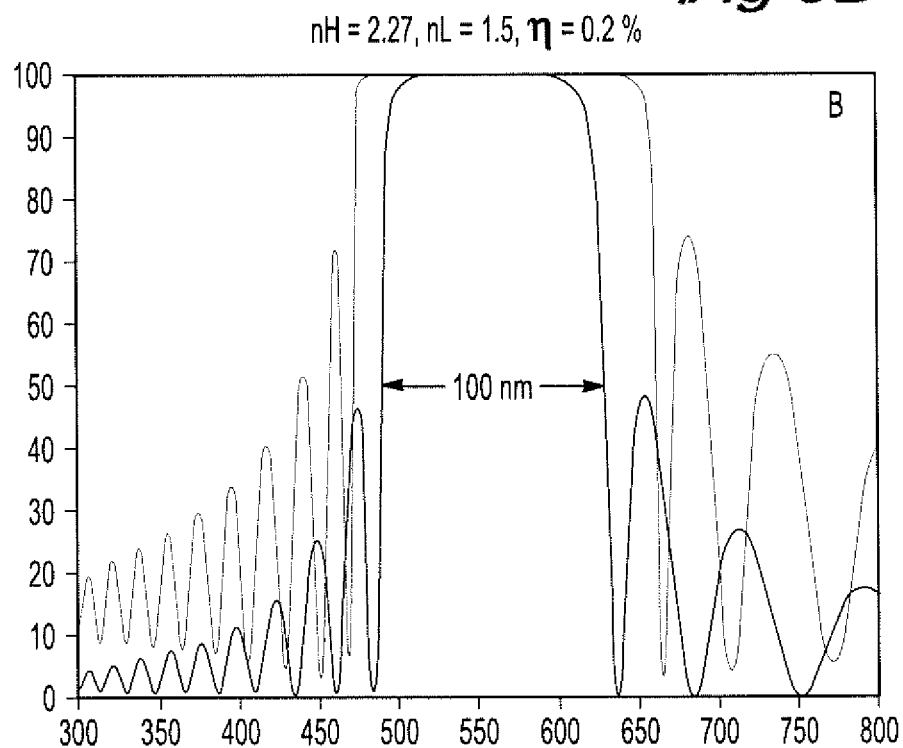
FIG. 5C is a graphical representation of corresponding reflectance spectra for the range to mid-range ratios of 0.2% shown in FIG. 5A.

An example of the reflectance as a function of the range to mid-range ratio is demonstrated in FIGS. 5A and 5B. FIG. 5A shows two curves for a TM mode range to mid-range ratio—one for $\eta_{TM}$ equal to 0.2% and one for $\eta_{TM}$ equal to 30%. FIGS. 5B and 5C show the corresponding reflectance for range to mid-range ratios labeled "A" and "B" in FIG.

5A with angles of incidence ranging from 0° to 45°. With a range to mid-range ratio of 30% and the angles of incidence ranging from 0° to 45°, the reflection band illustrated in FIG. 5B is approximately 300 nanometers. In contrast, for a range to mid-range ratio of 0.2% and the same angles of incidence, the reflection band illustrated in FIG. 5C is approximately 100 nanometers.

Regarding the center wavelength of the OSC pigment, equation 30 demonstrates that the center wavelength, and therefore the dispersion of the center wavelength, is a function of the incidence angle. In some instances, the OSC pigments of the present invention have a small dispersion of the center wavelength as a function of the incidence angle. The narrower the range of the dispersion of the center wavelength, the purer the observed color since a more narrow band of wavelengths are reflected from the reflector to, for example, a human eye.

Figure 6:
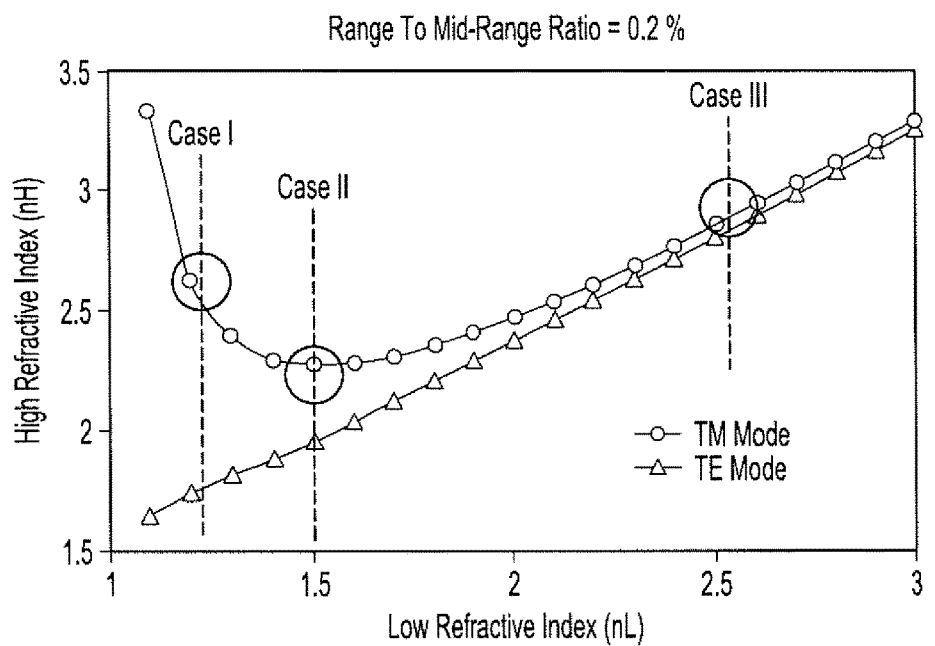
FIG. 6 is a graphical representation showing a comparison of the range to mid-range ratio of 0.2% for the transverse magnetic mode and transverse electric mode of electromagnetic radiation.

A method to control the dispersion of the center wavelength can include comparison of the range to mid-range ratios for the TM mode and the TE mode as a function of high reflection indices and low reflection indices. FIG. 6 illustrates a range to mid-range ratio of 0.2% for the TM mode and the TE mode as a function of high refractive index and low refractive index. As illustrated in FIG. 6, a relatively large difference between the high refractive indices for the TM mode and TE mode is shown by Case I, an intermediate difference by Case II, and a relatively small difference by Case III. Thus for a given range to mid-range ratio, different values for the high refractive index and the low refractive index can be chosen.

Figure 7A:
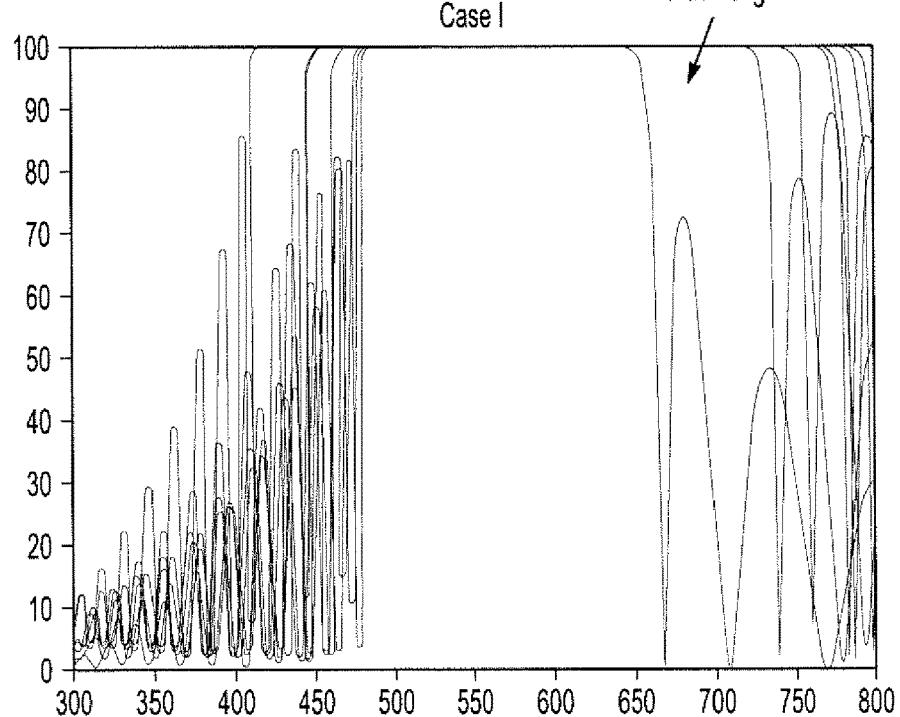
FIG. 7A is a graphical representation of the reflectance as a function of wavelength for Case I shown in FIG. 6.
Figure 7B:
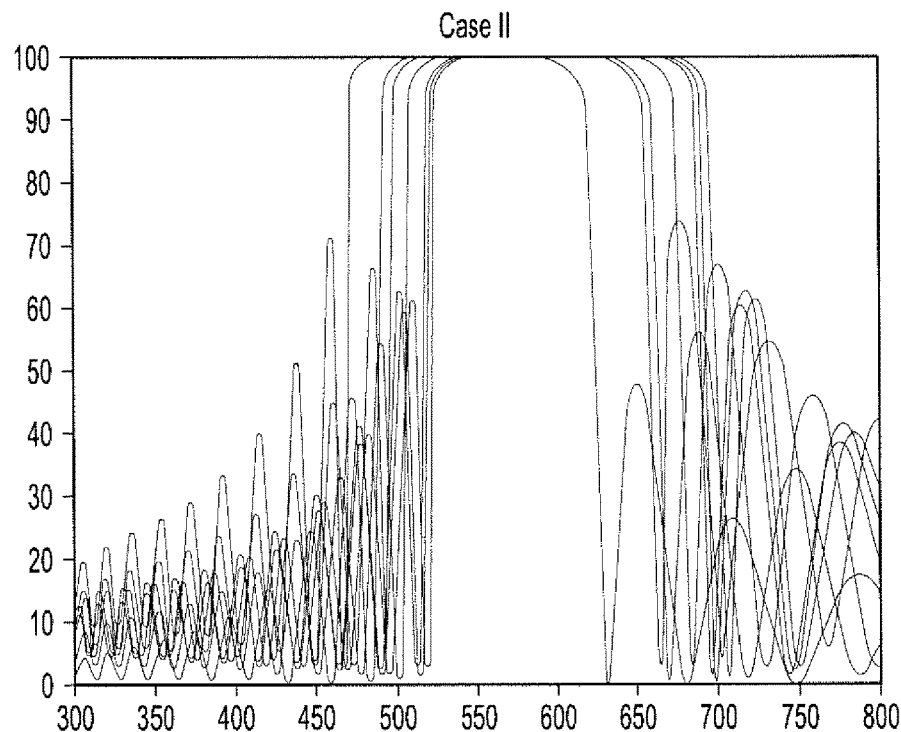
FIG. 7B is a graphical representation of the reflectance as a function of wavelength for Case II shown in FIG. 6.
Figure 7C:
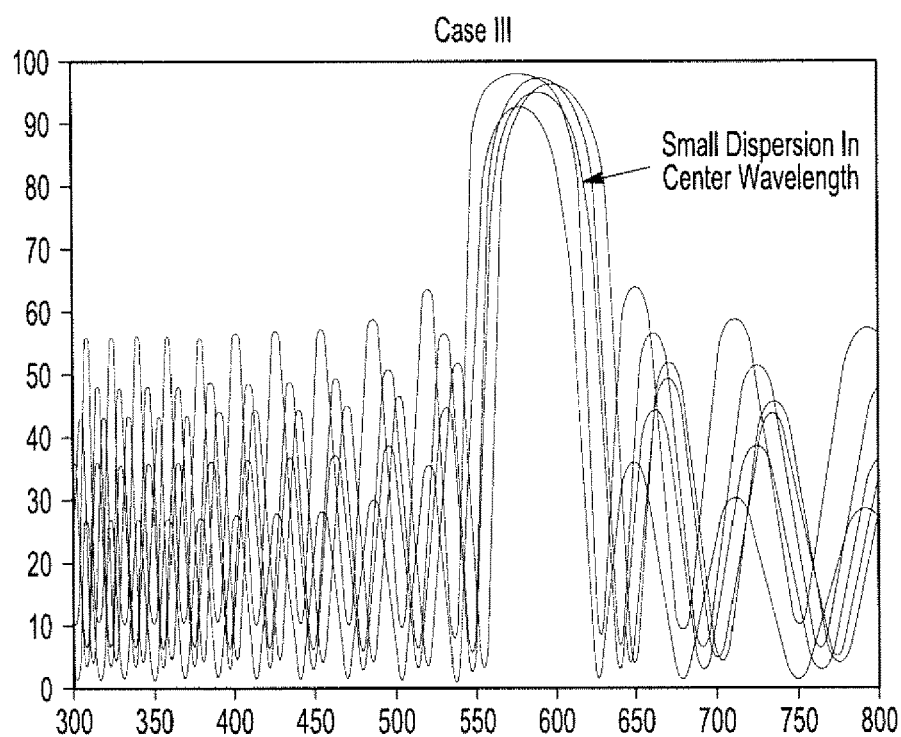
FIG. 7C is a graphical representation of reflectance as a function of wavelength for Case III shown in FIG. 6.
Figure 7D:
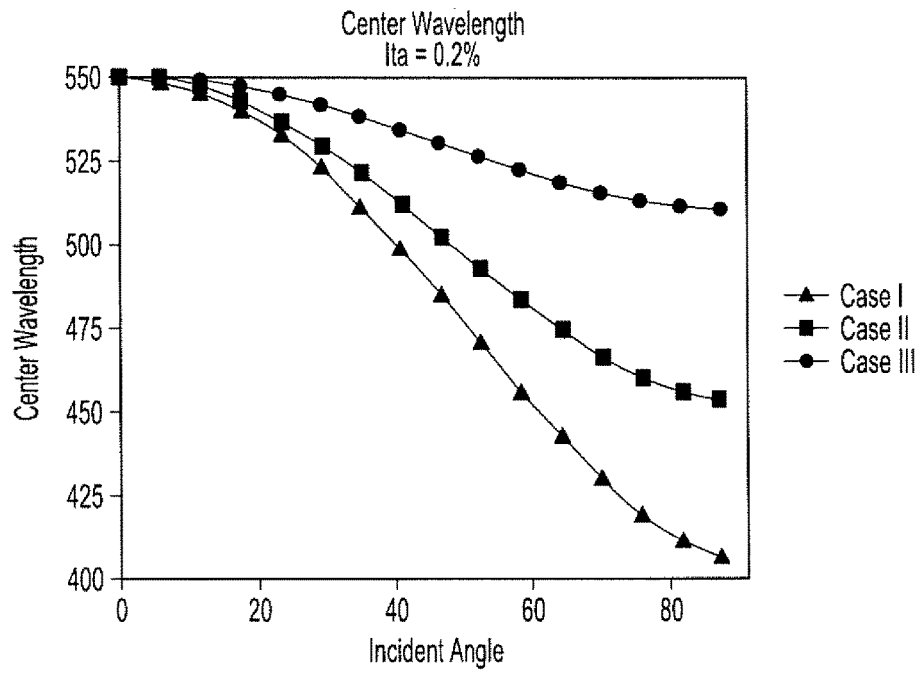
FIG. 7D is a graphical representation of the dispersion of the center wavelength in Case I, II and III.

Turning to FIG. 7A, the reflectance as a function of wavelength for Case I is illustrated wherein the high refractive index equals 2.61, the low refractive index equals 1.2 and the angle of incidence ranges from 0° to 45°. As illustrated by this figure, the center wavelength shifts significantly when electromagnetic radiation incident normal to the multilayer structure is compared to electromagnetic radiation incident 45° to the structure. In contrast, a relatively small difference between the high refractive index and the low refractive index, and equivalent angles of incidence, results in a small dispersion of the center wavelength as shown in FIG. 7C. Thus, for a narrow range of wavelengths to be reflected by a multilayer structure, a relatively small difference between the refractive indices between the first material 100 and the second material 200 is desired. FIG. 7D quantifies the dispersion in center wavelength with varying incident angle for Case I, II and III, and illustrates the reduction in dispersion from approximately 140 nm for Case I to approximately 40 nm for Case III. From equation 30, the dispersion of the center wavelength can be expressed as:

$$\Delta\lambda_c = \tag{33}$$

$$\lambda_c|_{\theta_0=0°} - \lambda_c|_{\theta_0=90°} = 2\left(\frac{n_H d_H}{1} + \frac{n_L d_L}{1} - \frac{n_H d_H}{\sqrt{1-\frac{n_0^2}{n_H^2}}} - \frac{n_L d_L}{\sqrt{1-\frac{n_0^2}{n_L^2}}}\right)$$

where:

$$\Delta\lambda_c = \frac{\lambda_0}{4} F_c \tag{34}$$

and $F_c$, the center wavelength dispersion factor can be expressed as:

$$F_c = \left(2 - \frac{1}{\sqrt{1-\frac{n_0^2}{n_H^2}}} - \frac{1}{\sqrt{1-\frac{n_0^2}{n_L^2}}}\right) \tag{35}$$

A quarter wave technique or design can be used to determine the refractive indices and thicknesses of alternating layers of material for an OSC pigment. Using this method, the optical thicknesses of the high refractive index material and low refractive index material are set to be equal to each other, and equal to one-fourth of a desired reflective wavelength. Thus, once the refractive indices of the multilayer structure have been selected, the thicknesses of the individual layers are set based on the following equation:

$$\eta_H d_H = \eta_L d_L = \frac{\lambda_0}{4} \tag{36}$$

where $\lambda_0 = \lambda_c$ at $\theta_0 = 0$.

Figure 8:
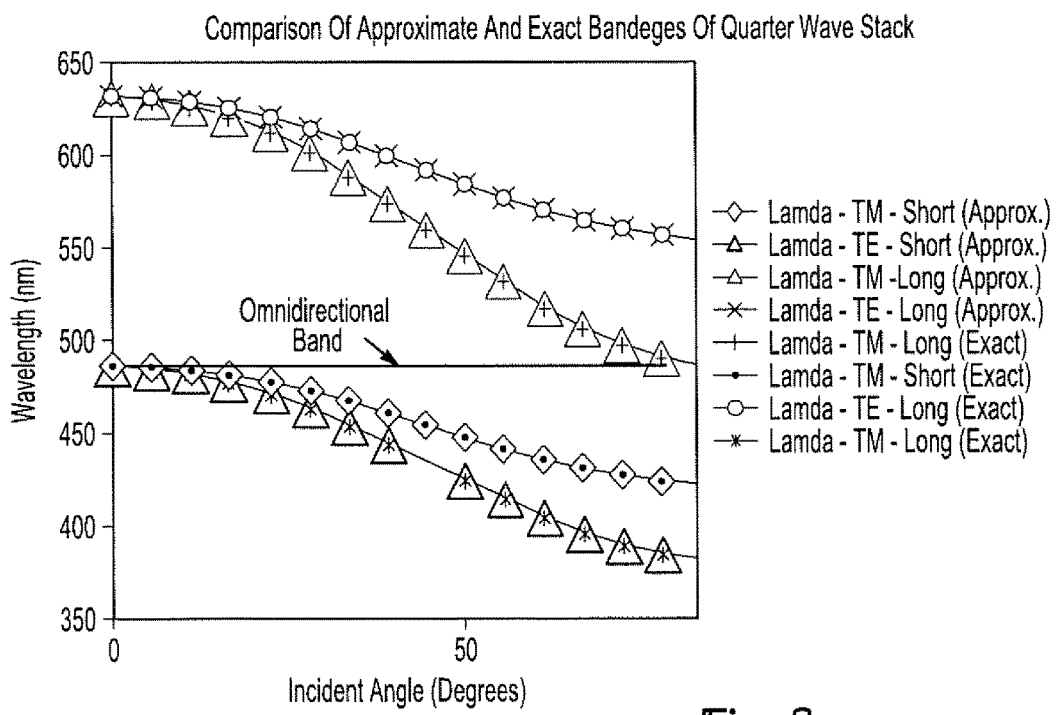
FIG. 8 is a graphical representation of the comparison of approximate and exact solutions for the bandedges of a multilayer structure designed according to the quarter wave technique.

Turning to FIG. 8, a graphical representation of an approximate solution to the bandedges of a quarter wave OSC pigment is shown according to the parameters of Case II mentioned above. This figure also shows the exact solutions whereby similar results are obtained. As illustrated in this figure, a narrow omnidirectional band at 490 nanometers is consistent with the reflectance band shown in FIG. 7B. It is appreciated that to obtain the narrow omnidirectional band that the dispersion of the center wavelength must be minimized.

Figure 9A:
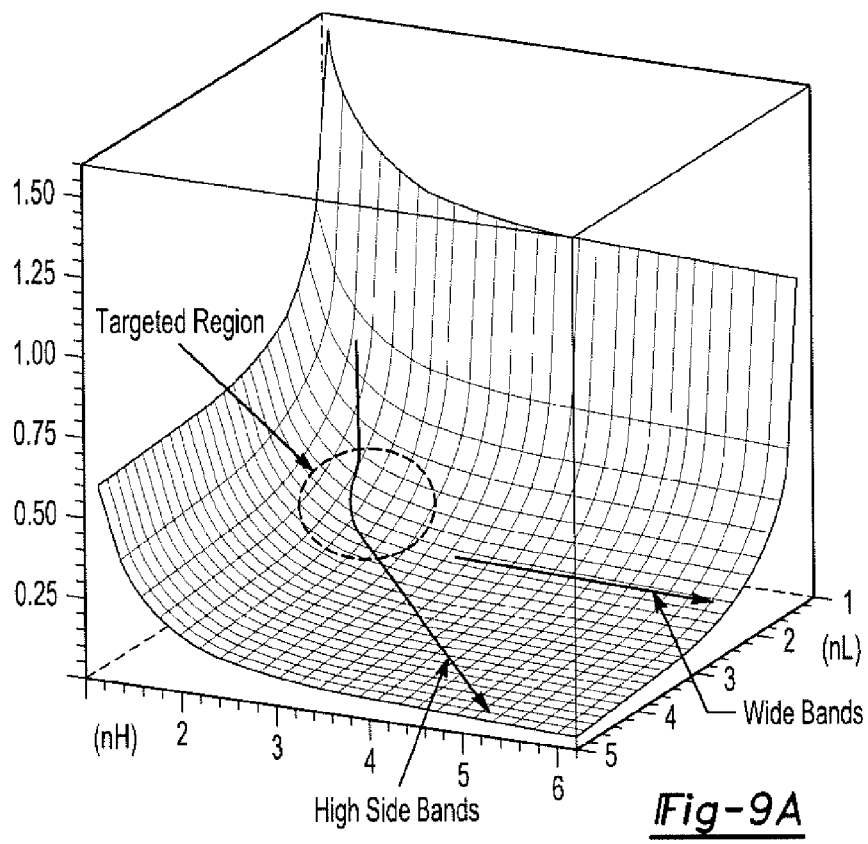
FIG. 9A is a graphical representation of a center wavelength dispersion factor as a function of high refractive indices and low refractive indices.

The center wavelength dispersion factor is shown in FIG. 9A as a function of the high refractive index and the low refractive index. Thus, from equation 33 and FIG. 9A, the dispersion of the center wavelength can be reduced with the proper selection of high and low refractive index material. Also illustrated in FIG. 9A with the "Wide Bands" arrow is the fact that a multilayer structure exhibiting a large difference between the high refractive index and the low refractive index will possess a wide reflection band even though the center wavelength dispersion factor is relatively low. Likewise, when the alternating layers possess a first material with a high refractive index material that approaches the low refractive index of the second material, higher side bands of the reflected electromagnetic radiation occur as illustrated by the "High side bands" arrow. The higher side bands can be reduced using a variety of methods, illustratively including the use of Rugate filters.

Figure 9B:
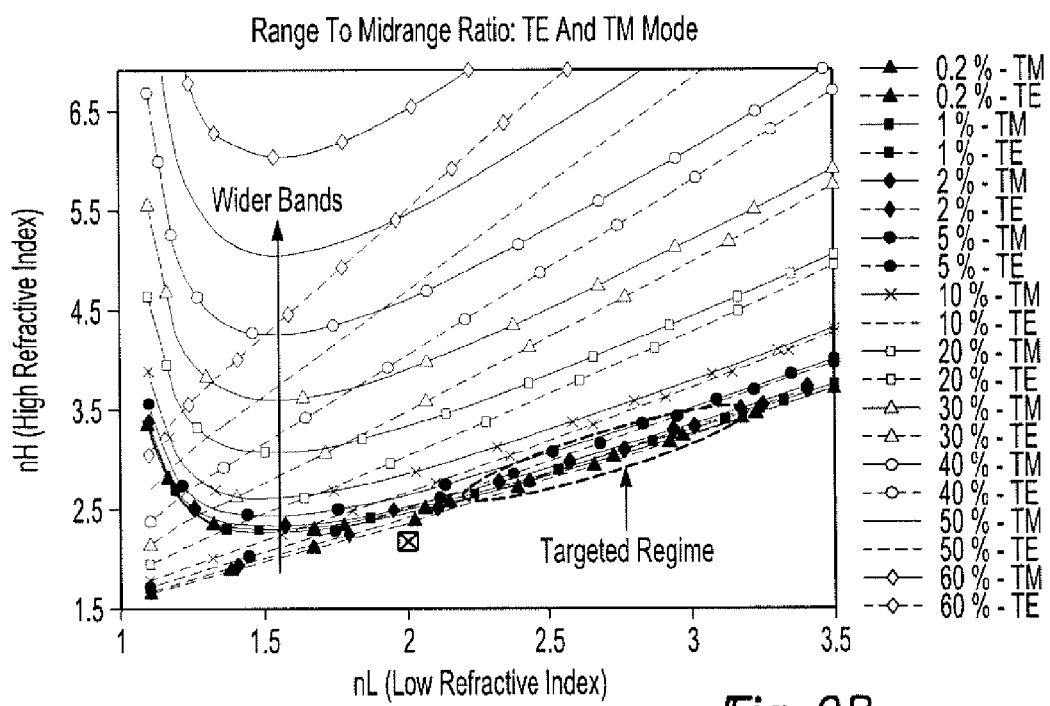
FIG. 9B is a graphical representation of the range to mid-range ratios for transverse electric mode and traverse magnetic mode wherein a desired region of high reflective indices and low reflective indices is highlighted.

FIG. 9B provides a targeted region for range to mid-range ratios, high refractive indices and low refractive indices. When the difference between range to mid-range ratio of the TE and TM modes is relatively large, a wide or large reflection band of the multilayer structure occurs. In contrast, for relatively small range to mid-range ratios, a relatively narrow reflection band is exhibited with a targeted regime of such values shown in the diagram.

Figure 10A:
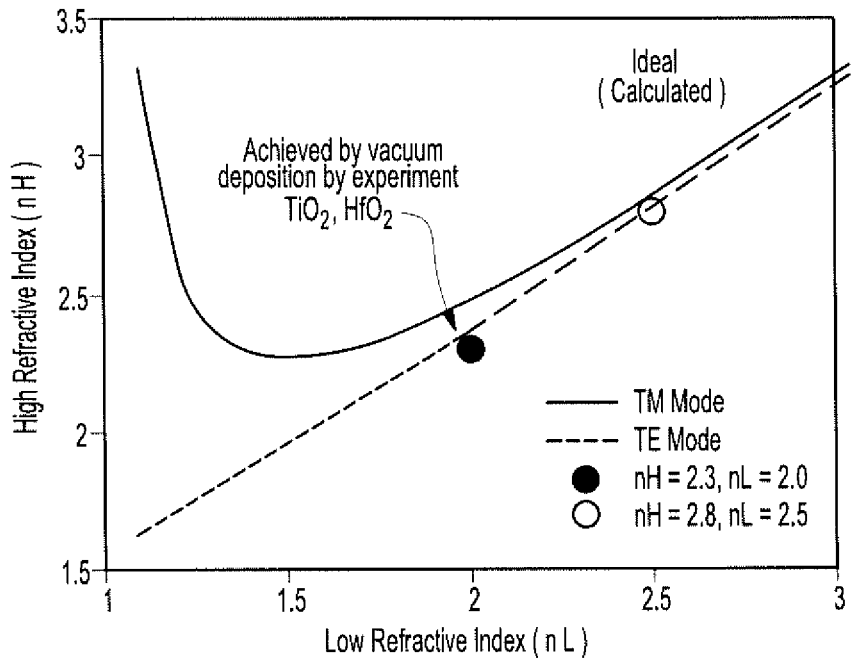
FIG. 10A is a graphical representation illustrating a refractive index zone necessary for omnidirectional structural color.

With regard to a non-periodic layered structure, FIG. 10A illustrates a graph of a range to mid-range ratio equal to 0.2% for a transverse magnetic mode (TM) and transverse electric mode (TE) of electromagnetic radiation plotted as a function of high refractive index versus low refractive index is shown. The figure also has two data points: one corresponding to an "ideal" multilayer stack made from a first material with a refractive index of 2.8 and a second material with a refractive index of 2.5; and another one corresponding to an actual fabricated multilayer stack made from vacuum deposition of TiO$_2$ with a resulting refractive index of 3.3 and a HfO$_2$ with a resulting refractive index of 2.0. As shown by this figure, the limit of materials and their refractive indices is an important factor that must be considered when designing and manufacturing a multilayer stack that affords an omnidirectional structural color.

Figure 10B:
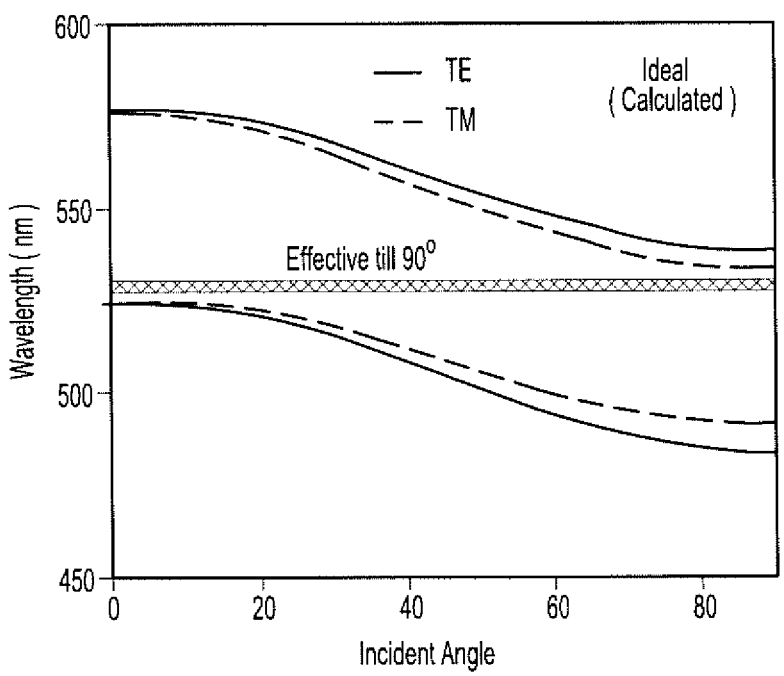
FIG. 10B is a graphical representation of a calculated or ideal band structure showing complete omnidirectionality.
Figure 10C:
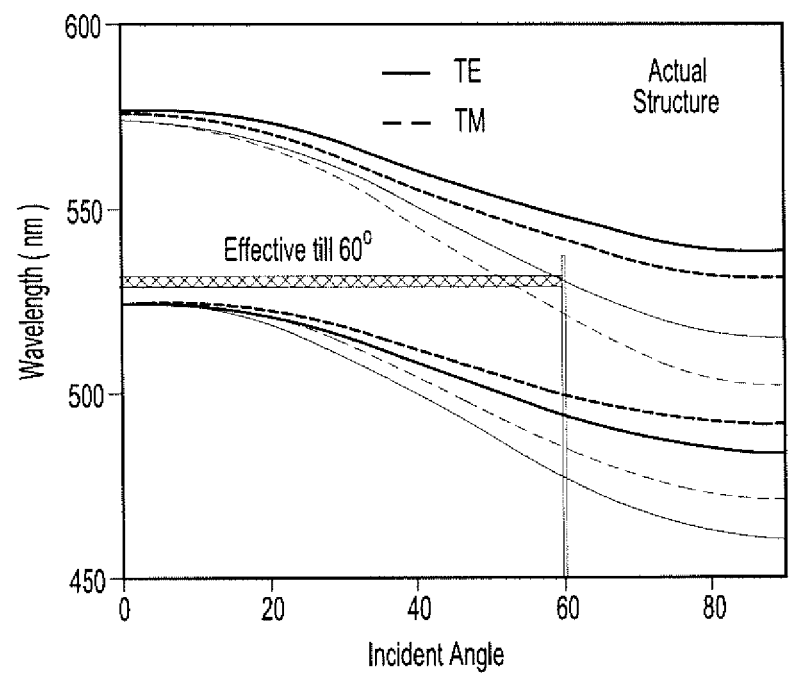
FIG. 10C is a graphical representation illustrating an actual band structure for a fabricated omnidirectional reflector.

Turning to FIG. 10B, a plot of reflectance as a function of incident angle illustrates the omnidirectional properties exhibited by the ideal multilayer stack when viewed from angles between 0 and 90 degrees. In contrast, FIG. 10C illustrates a reduction in the omnidirectional properties exhibited by the actual fabricated multilayer stack, in particular a decrease in the angle-independent reflectance from 0-90 degrees to 0-60 degrees.

Figure 10D:
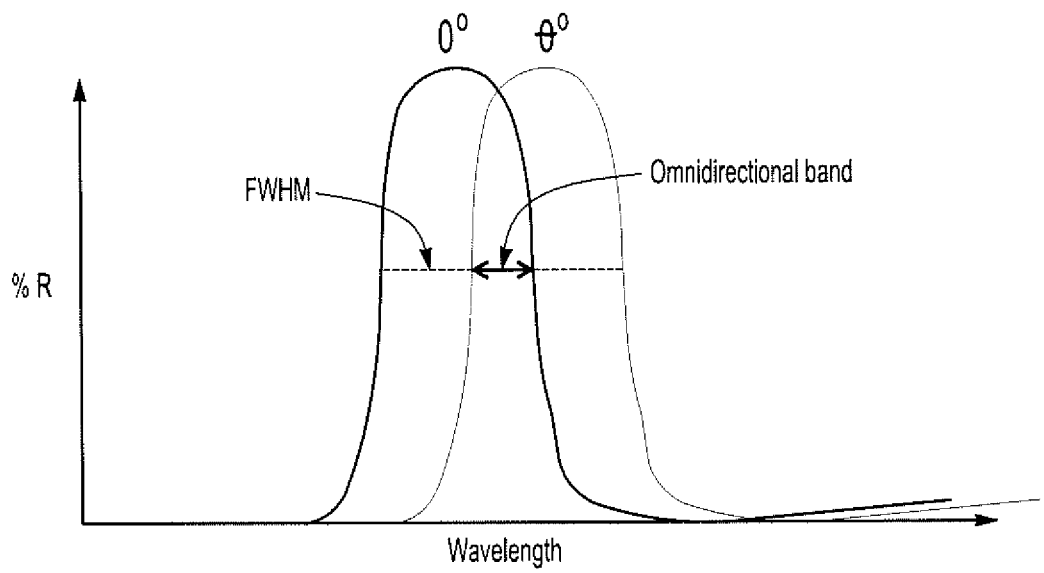
FIG. 10D is a graphical representation illustrating an omnidirectional band for a multilayer stack.

It is appreciated that on a plot of reflectance versus wavelength, an angle-independent band of reflected electromagnetic radiation is the common reflectance of a multilayer stack when viewed from angles between 0 and theta (θ) degrees as illustrated by the range of wavelengths indicated by the double-headed arrow in FIG. 10D. For the purposes of the present invention, this band of angle-independent reflection radiation and width of a reflection band is measured at the average of the full width at half maximum (FWHM) for the two reflectance curves (0° and 0°) and is hereafter referred to as an omnidirectional band when viewed between the angles of 0 and θ. For example, FIGS. 10B and 10C illustrate omnidirectional behavior for angles of θ equal to 90 and 60 degrees, respectively.

Figure 11:
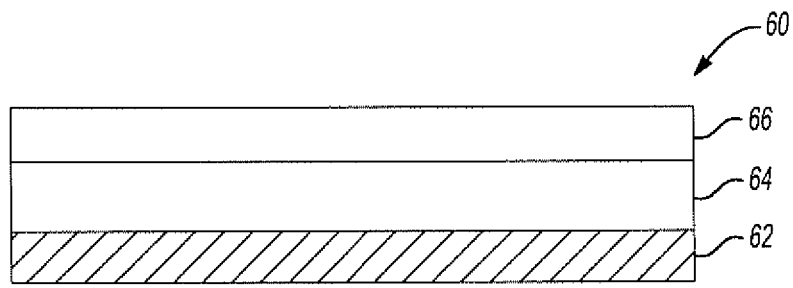
FIG. 11 is a schematic diagram of a multilayer structure according to an embodiment of the present invention.
Figure 12:
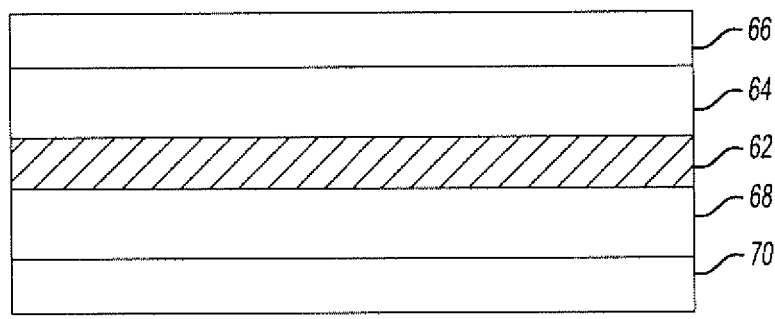
FIG. 12 is a schematic diagram of a multilayer structure according to an embodiment of the present invention.

Referring now to FIG. 11, a multilayer structure 60 with an absorbing layer 62 and a first layer 64 having a first thickness and made from a first material with a first index of refraction extending across the absorbing layer 62 is shown. A second layer 66 with a second thickness and made from a second material with a second index of refraction extending across the first layer 64 is also shown. An opposite side of the absorbing layer 62 can have at least two layers 68, 70 extending thereacross as shown in FIG. 12, and the layers 68, 70 may or may not be the same material and/or have the same thickness as the layers 64, 66, respectively.

Figure 13:
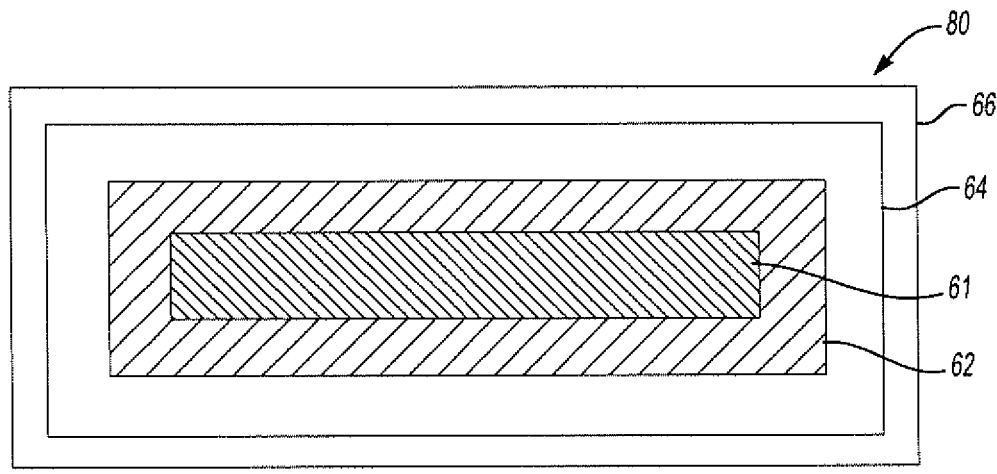
FIG. 13 is a schematic diagram of a multilayer structure according to an embodiment of the present invention.

The multilayer structure can also be applied or be present on a substrate 61, e.g. a particle, as shown generally at reference numeral 80 in FIG. 13. As shown in FIG. 13, the absorbing layer 62, first layer 64 and second layer 66 can be present as a coating on the substrate 61. Furthermore, it is appreciated that more than two layers can be present over the absorbing layer and/or substrate.

Figure 14:
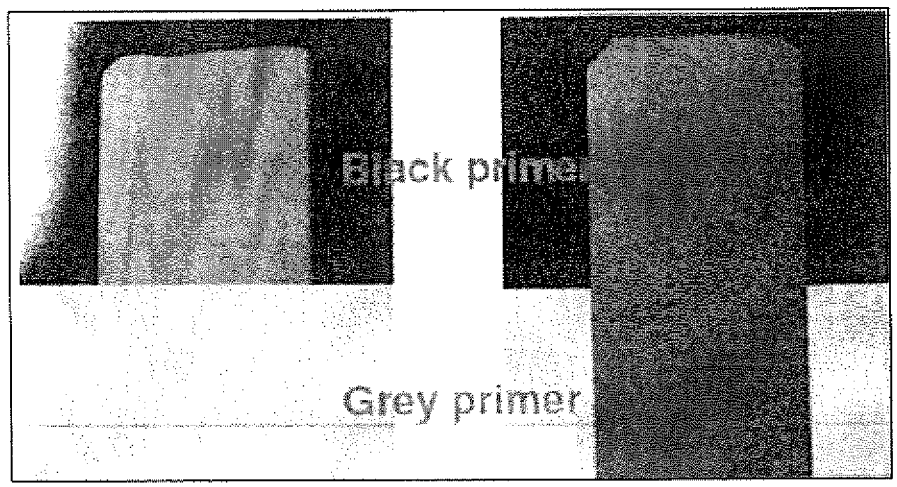
FIG. 14 is an optical photograph of a paint having an omnidirectional structural color pigment without an absorbing layer (left-hand side) applied over a black primer layer and a grey primer layer and an omnidirectional structural color pigment with an absorbing layer (right-hand side) applied over a black primer layer and a grey primer layer.

The multilayer structure can be in the form of a paint pigment and the absorbing layer can provide a "hiding" effect as illustrated in FIG. 14 where paint having an omnidirectional structural color pigment without an absorbing layer and paint having the same color omnidirectional structural color pigment with an absorbing layer has been applied onto adjacent layers of a grey primer and a black primer. As shown on the left-hand side of the figure, without an absorbing layer, the paint allows for the "bleed through" of the grey primer and as such a black primer is required in order to fully take advantage of the paint color. In contrast, with the absorbing layer being part of the omnidirectional structural color paint pigment shown on the right-hand side of the figure, the paint can be used on a grey primer, a black primer, and the like.

In order to provide additional teaching of the process and yet not limit the scope of the invention in any way, examples of OSC multilayer stacks are provided below.

Example 1

Figure 15A:
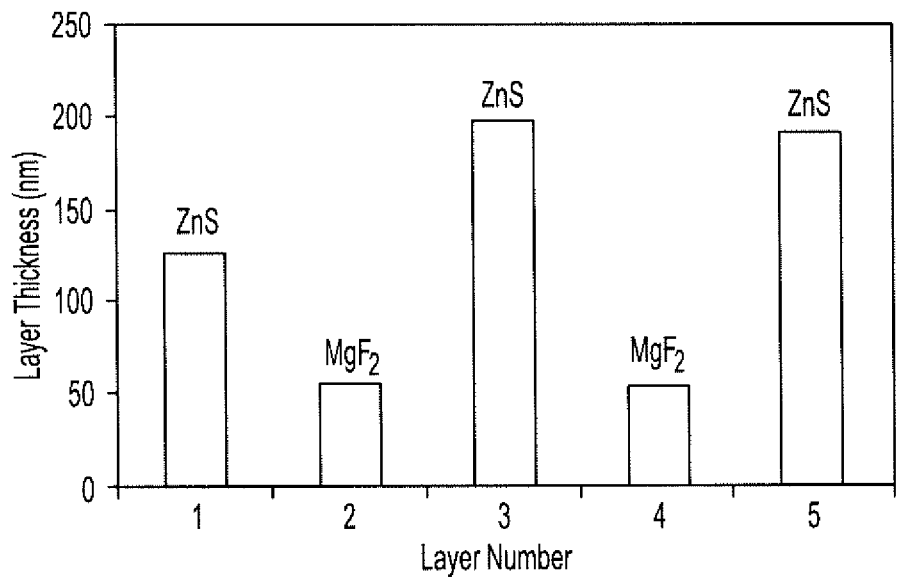
FIG. 15(A) is a graphical representation for the thickness and material for each layer of a 5-layer $ZnS$—$MgF_2$—$ZnS$—$MgF_2$—$ZnS$ multilayer stack design.
Figure 15B:
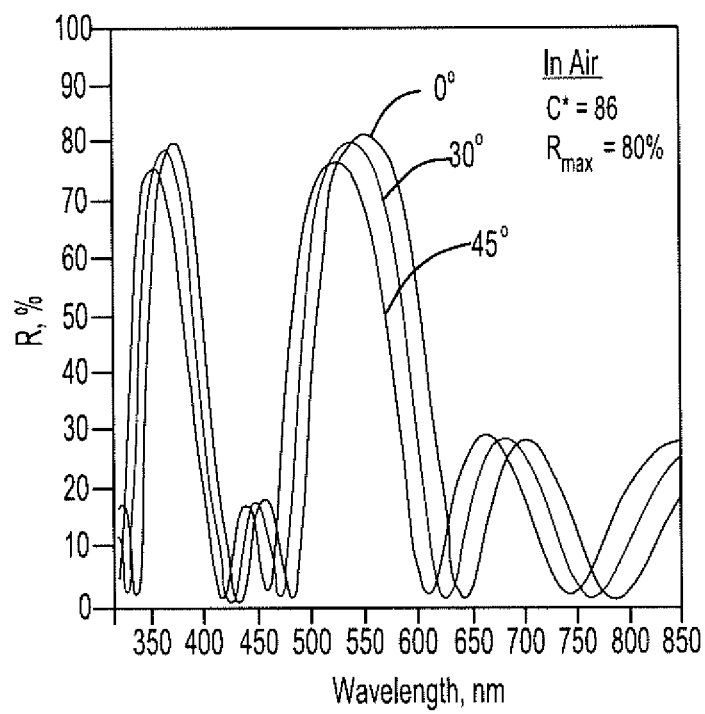
FIG. 15(B) is a graphical representation for the illustrating an omnidirectional band for the multilayer stack of FIG. 15(A) in air.
Figure 15C:
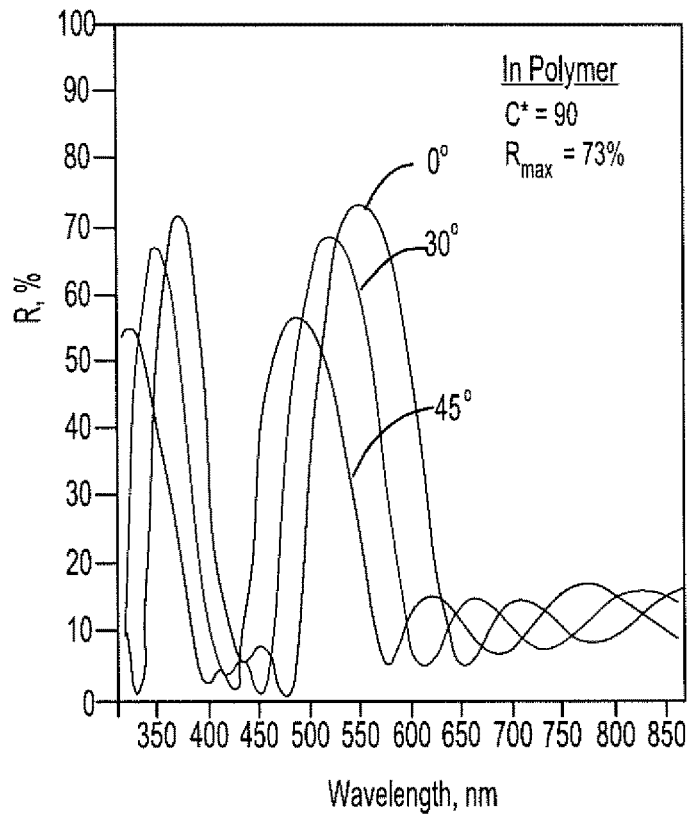
FIG. 15(C) is a graphical representation for the illustrating an omnidirectional band for the multilayer stack of FIG. 15(A) in a polymer.

Referring now to FIGS. 15A-15C, the inventive process disclosed herein was used to design a 5-layer multilayer stack on a 100 nm thick Cr core that can have a platelet, acicular or spherical physical shape/form. It is appreciated that the 5-layer multilayer stack can be present symmetrically on opposing sides of the 100 mm thick Cr core.

FIG. 15A illustrates the materials and their respective thicknesses for the 5 layers while FIG. 15B provides reflectance versus wavelength for the 5-layer multilayer stack+Cr core exposed to white light in air and FIG. 15C provides the same for the 5-layer multilayer stack+Cr core exposed to white light in a polymer binder. It is appreciated that the refractive index of the material layers can vary as a function of wavelength and such variation was taken in account during the design process. FIGS. 15B and 15C also show the chroma and maximum reflection exhibited by the for the 5-layer multilayer stack+Cr core structure.

As shown in FIG. 15B, the 5-layer structure in air exhibited a chroma of 86; between 75-80% reflection of incident light waves; a reflection band width of less than 200 nm with a center wavelength ($\lambda_c$) of 550 nm (yellowish-green visual color) for a 0° angle of viewing; and a center wavelength shift ($\Delta\lambda_c$) of less than 50 nm when the structure is viewed from angles between 0 and 45°. In addition, the structure provides UV protection by providing a UV reflection band centered at 375 nm.

FIG. 15C illustrates the same 5-layer multilayer stack+Cr core in a polymer with a chroma of 90, 55-73% reflectance, a reflection band width of less than 200 nm, a center wavelength shift of less than 100 nm when the structure is viewed from angles between 0 and 45° and a UV reflection band centered at 375 nm.

Example 2

Figure 16A:
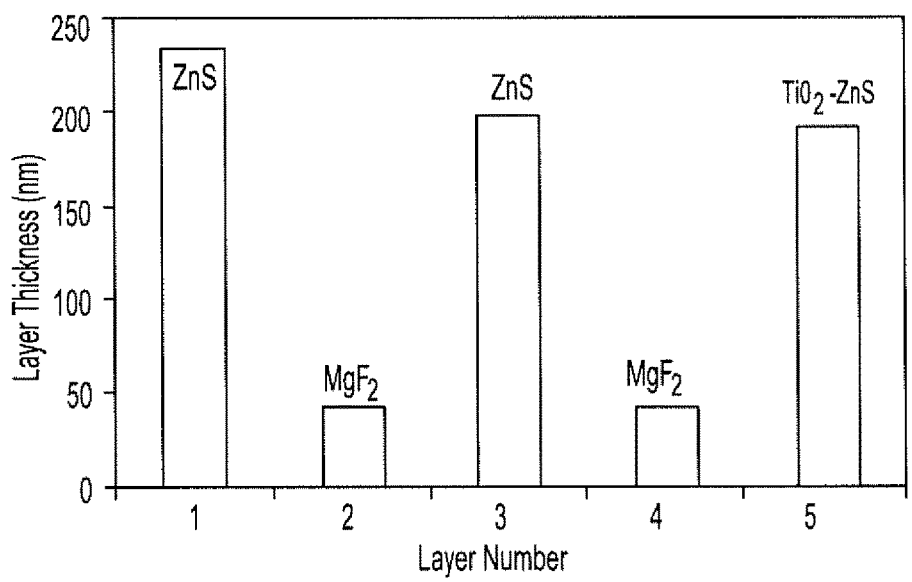
FIG. 16(A) is a graphical representation for the thickness and material for each layer of a 5-layer $ZnS$—$MgF_2$—$ZnS$—$MgF_2$—$TiO_2/ZnS$ multilayer stack design.
Figure 16B:
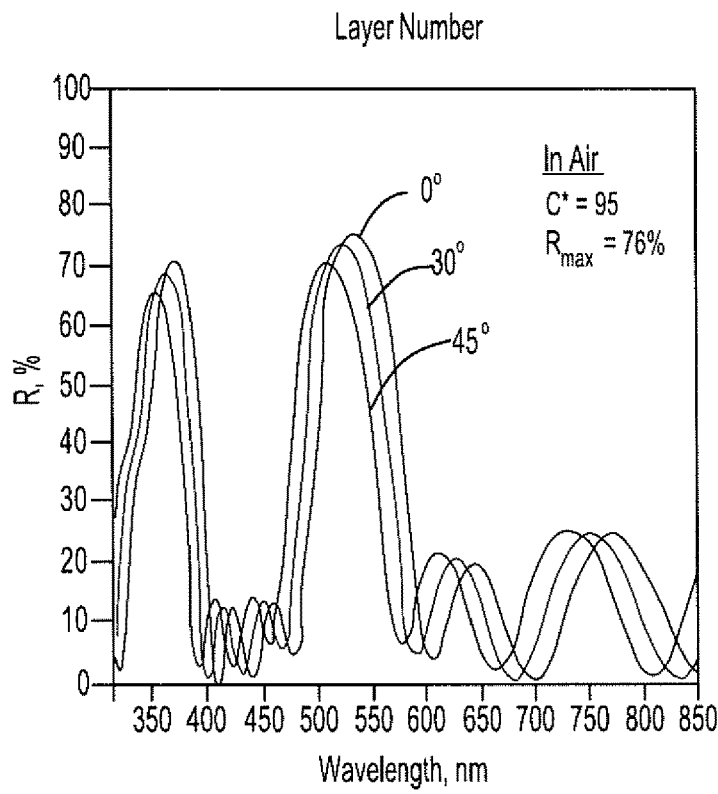
FIG. 16(B) is a graphical representation for the illustrating an omnidirectional band for the multilayer stack of FIG. 16(A) in air.
Figure 16C:
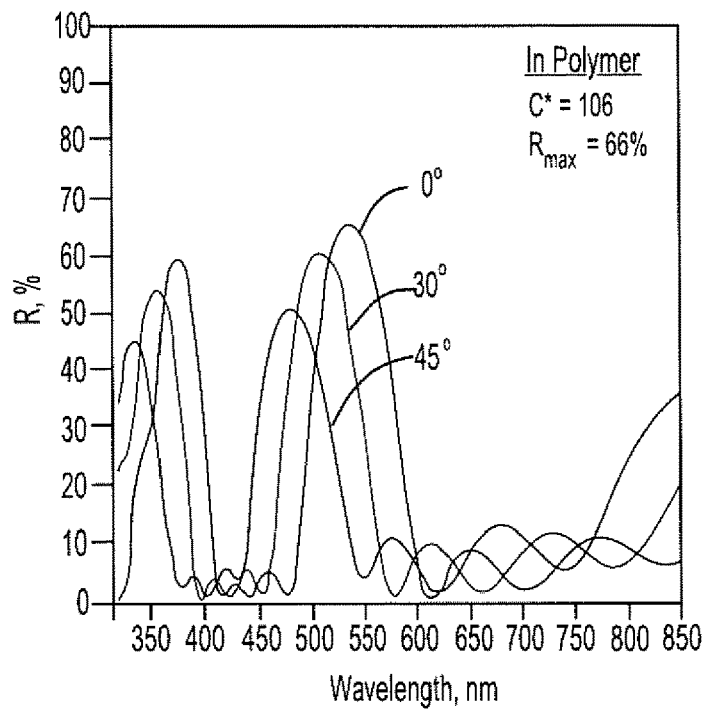
FIG. 16(C) is a graphical representation for the illustrating an omnidirectional band for the multilayer stack of FIG. 16(A) in a polymer.

Referring now to FIGS. 16A-16C, the inventive process disclosed herein was used to design a 5-layer multilayer stack on a 1 mm thick Cr core as described above. In addition, the fifth layer had a 70-30 composition (wt %) of TiO$_2$—ZnS, respectively.

FIG. 16A illustrates the materials and their respective thicknesses for the 5 layers while FIG. 16B provides reflectance versus wavelength for the 5-layer multilayer stack+Cr core exposed to white light in air and FIG. 16C provides the same for the 5-layer multilayer stack+Cr core exposed to white light in a polymer binder. FIGS. 16B and 16C also show the chroma and maximum reflection exhibited by the for the 5-layer multilayer stack+Cr core structure.

As shown in FIG. 16B, the 5-layer structure in air exhibited a chroma of 95; between 71-76% reflection of incident light waves; a reflection band width of less than 200 nm with a center wavelength of 537 nm (yellowish-green visual color) for a 0° angle of viewing; and a center wavelength shift of less than 50 nm when the structure is viewed from angles between 0 and 45°. In addition, the structure provides UV protection by providing a UV reflection band centered at 375 nm.

FIG. 16C illustrates the same 5-layer multilayer stack+Cr core in a polymer with a chroma of 106, 51-66% reflectance, a reflection band width of less than 200 nm, a center wavelength shift of less than 100 nm when the structure is viewed from angles between 0 and 45° and a UV reflection band centered at 375 nm.

Example 3

Figure 17A:
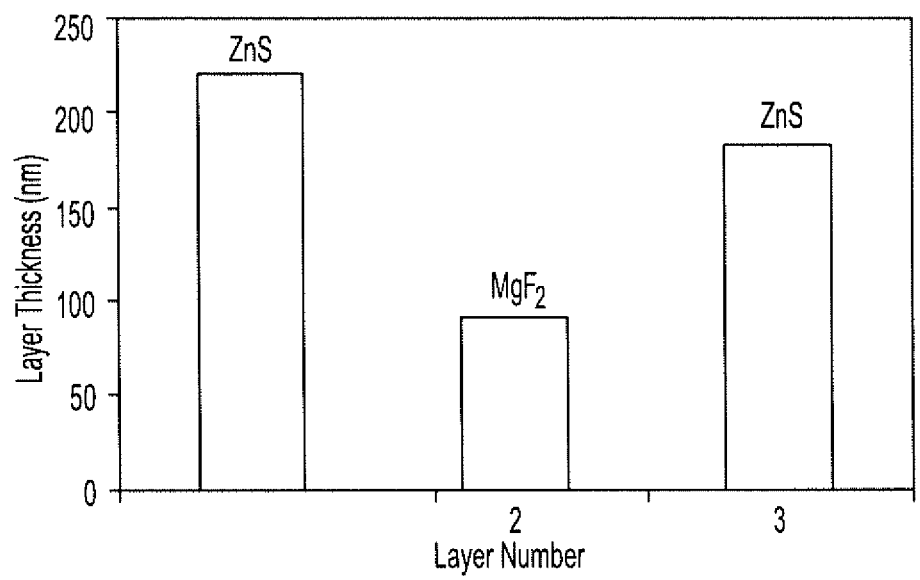
FIG. 17(A) is a graphical representation for the thickness and material for each layer of a 3-layer $ZnS$—$MgF_2$—$ZnS$ multilayer stack design.
Figure 17B:
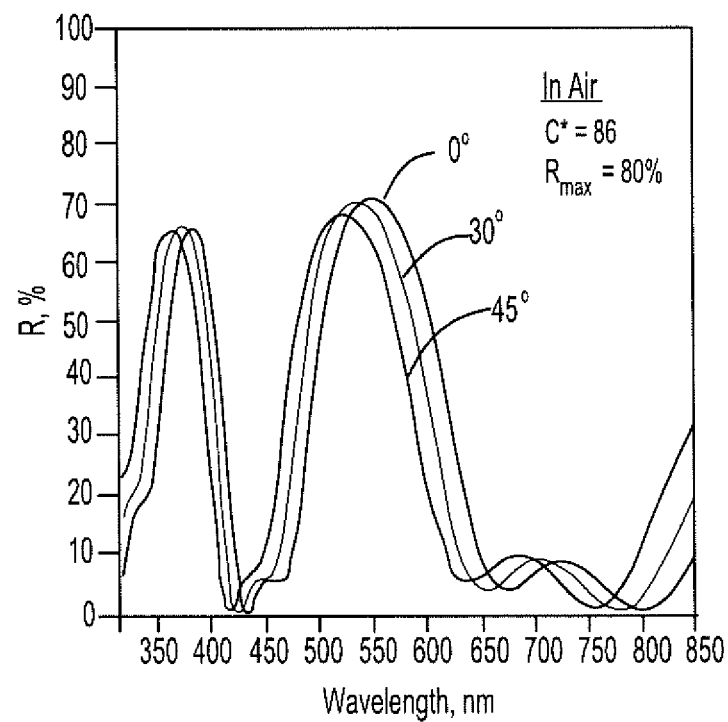
FIG. 17(B) is a graphical representation for the illustrating an omnidirectional band for the multilayer stack of FIG. 17(A) in air.
Figure 17C:
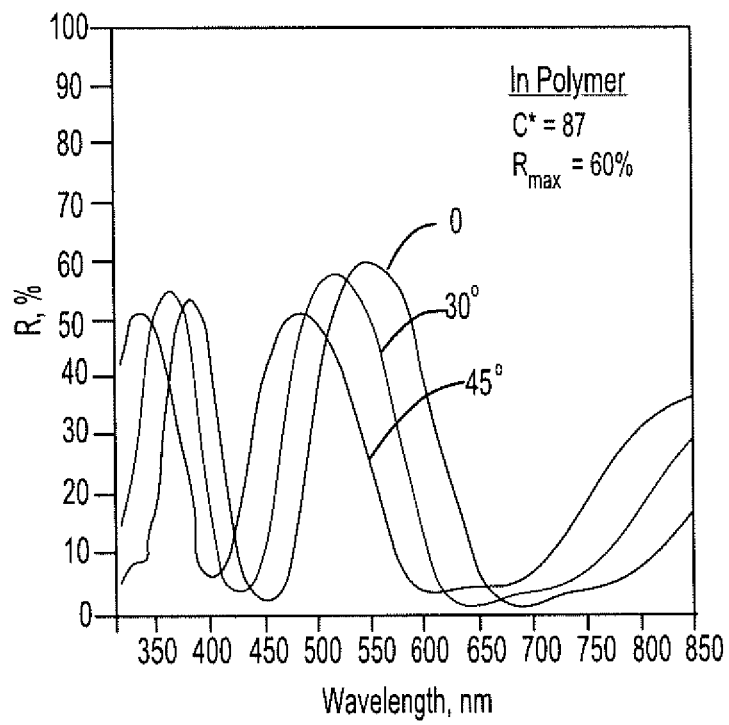
FIG. 17(C) is a graphical representation for the illustrating an omnidirectional band for the multilayer stack of FIG. 17(A) in a polymer.

Referring now to FIGS. 17A-17C, the inventive process disclosed herein was used to design a 3-layer multilayer stack on a 1 mm thick Cr core as described above. It is appreciated that the 3-layer multilayer stack can be present symmetrically on opposing sides of the 1 mm thick Cr core.

FIG. 17A illustrates the materials and their respective thicknesses for the 3 layers while FIG. 17B provides reflectance versus wavelength for the 3-layer multilayer stack+Cr core exposed to white light in air and FIG. 17C provides the same for the 3-layer multilayer stack+Cr core exposed to white light in a polymer binder. FIGS. 17B and 17C also show the chroma and maximum reflection exhibited by the for the 3-layer multilayer stack+Cr core structure in air and polymer, respectively.

As shown in FIG. 17B, the 3-layer structure in air exhibited a chroma of 86; between 67-70% reflection of incident light waves; a reflection band width of less than 200 nm with a center wavelength of 550 nm (yellowish-green visual color) for a 0° angle of viewing; and a center wavelength shift of less than 50 nm when the structure is viewed from angles between 0 and 45°. In addition, the structure provides UV protection by providing a UV reflection band centered at 375 nm.

FIG. 17C illustrates the same 3-layer multilayer stack+Cr core in a polymer with a chroma of 87, 50-60% reflectance, a reflection band width of less than 200 nm, a center wavelength shift of less than 100 nm when the structure is viewed from angles between 0 and 45° and a UV reflection band centered at 375 nm.

Example 4

Figure 18A:
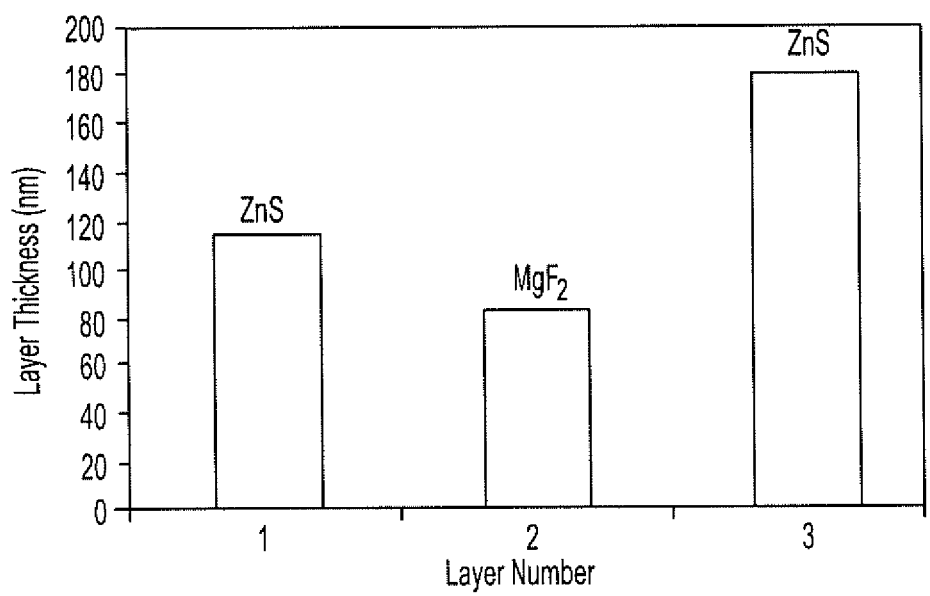
FIG. 18(A) is a graphical representation for the thickness and material for each layer of another 3-layer $ZnS$—$MgF_2$—$ZnS$ multilayer stack design.
Figure 18B:
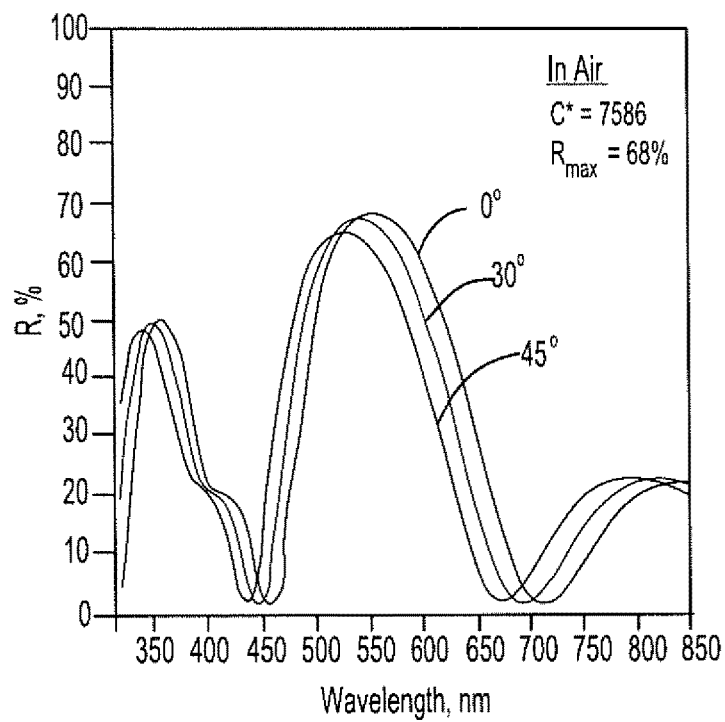
FIG. 18(B) is a graphical representation for the illustrating an omnidirectional band for the multilayer stack of FIG. 18(A) in air.
Figure 18C:
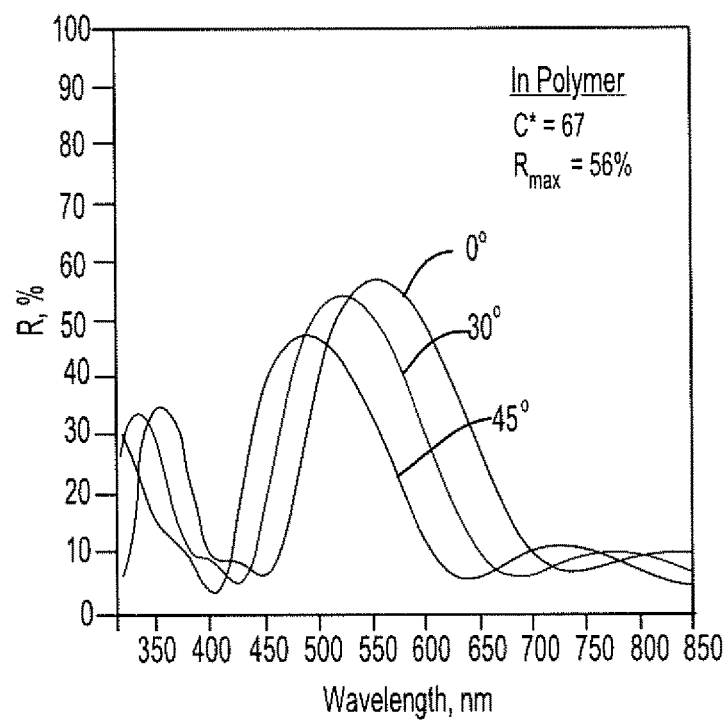
FIG. 18(C) is a graphical representation for the illustrating an omnidirectional band for the multilayer stack of FIG. 18(A) in a polymer.

Referring now to FIGS. 18A-18C, the inventive process disclosed herein was used to design another 3-layer multilayer stack on a 1 mm thick Cr core as described above. It is appreciated that the 3-layer multilayer stack can be present symmetrically on opposing sides of the 1 mm thick Cr core.

FIG. 18A illustrates the materials and their respective thicknesses for the 3 layers while FIG. 18B provides reflectance versus wavelength for the 3-layer multilayer stack+Cr core exposed to white light in air and FIG. 18C provides the same for the 3-layer multilayer stack+Cr core exposed to white light in a polymer binder. FIGS. 18B and 18C also show the chroma and maximum reflection exhibited by the for the 3-layer multilayer stack+Cr core structure in air and polymer, respectively.

As shown in FIG. 18B, the 3-layer structure in air exhibited a chroma of 75; between 65-68% reflection of incident light waves; a reflection band width of less than 200 nm with a center wavelength of 562 nm (yellowish-green visual color) for a 0° angle of viewing; and a center wavelength shift of less than 50 nm when the structure is viewed from angles between 0 and 45°. In addition, the structure provides UV protection by providing a UV reflection band centered at 362 nm.

FIG. 17C illustrates the same 3-layer multilayer stack+Cr core in a polymer with a chroma of 67, 47-56% reflectance, a reflection band width of less than 200 nm, a center wavelength shift of less than 100 nm when the structure is viewed from angles between 0 and 45° and a UV reflection band centered at 362 nm.

Given the above examples, it is appreciated that a wide variety of OSC multilayer stacks can be designed and optimized using the process disclosed herein. It is also appreciated that the OSC multilayer stacks reflect a single narrow band of visible electromagnetic radiation with a reflectance of between 65-80% of incident light waves. In addition, depending upon material cost considerations, availability, and the like, the process provides a powerful tool to design cost effective OSC multilayer stacks that can be used as coatings, pigments, and the like. It is also appreciated that the manufacture of such OSC multilayer stacks can be executed by providing the given material for a particular design and producing a multilayer structure having thicknesses as determined by the design. Thereafter, the multilayer structure can be used as a coating or, in the alternative, removed from a sacrificial substrate and ground to a desired size such that it can be used as a pigment, e.g. a paint pigment.

For example and for illustrative purposes only, Table 1 below provides a list of illustrative materials for production of multilayer stacks. It is appreciated that the opportunity to use a greater range of materials further affords for a greater range of manufacturing techniques to make desired multilayer stacks/structures. In addition, multilayer stacks/structures disclosed herein can further be used to make pigments for paints and the like.

TABLE 1

Refractive Index Materials (visible region)

| Material | Refractive Index |
| --- | --- |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$)-solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1naphthyl)-4,4'Diamine (NPB) | 1.7 |
| Polyamide-imide (PEI) | 1.6 |
| Zinc Sulfide (ZnS) | 2.3 + i(0.015) |
| Titanium Nitride (TiN) | 1.5 + i(2.0) |
| Chromium (Cr) | 2.5 + i(2.5) |
| Niobium Pentoxide (Nb2O5) | 2.4 |
| Zirconium Oxide (ZrO2) | 2.36 |
| Hafnium Oxide (HfO2) | 1.9-2.0 |
| Fluorcarbon (FEP) | 1.34 |
| Polytetrafluro-Ethylene (TFE) | 1.35 |
| Fluorcarbon (FEP) | 1.34 |
| Polytetrafluro-Ethylene(TFE) | 1.35 |
| Chlorotrifluoro-Ethylene(CTFE) | 1.42 |
| Cellulose Propionate | 1.46 |
| Cellulose Acetate Butyrate | 1.46-1.49 |
| Cellulose Acetate | 1.46-1.50 |
| Methylpentene Polymer | 1.485 |
| Acetal Homopolymer | 1.48 |
| Acrylics | 1.49 |
| Cellulose Nitrate | 1.49-1.51 |
| Ethyl Cellulose | 1.47 |
| Polypropylene | 1.49 |
| Polysulfone | 1.633 |
| Chromium (Cr) | 3.0 |
| Tin Sulfide (SnS) | 2.6 |

TABLE 1-continued

Refractive Index Materials
(visible region)

| Material | Refractive Index |
|---|---|
| Low Porous Si | 2.56 |
| Chalcogenide glass | 2.6 |
| Cerium Oxide (CeO$_2$) | 2.53 |
| Tungsten (W) | 2.5 |
| Gallium Nitride (GaN) | 2.5 |
| Manganese (Mn) | 2.5 |
| Niobium Oxide (Nb$_2$O$_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide (TiO$_2$)-vacuum deposited | 2.43 |
| Hafnium Oxide (HfO$_2$) | 2.0 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica (SiO2) | 1.23 |
| Sputtered Silica (SiO2) | 1.47 |
| Vacuum Deposited Silica (SiO2) | 1.46 |
| Niobium Oxide (Nb$_2$O$_5$) | 2.1 |
| Aluminum (Al) | 2.0 + i(15) |
| Silicon Nitride (SiN) | 2.1 |
| Mica | 1.56 |
| Polyallomer | 1.492 |
| Polybutylene | 1.50 |
| Ionomers | 1.51 |
| Polyethylene (Low Density) | 1.51 |
| Nylons (PA) Type 11 | 1.52 |
| Acrylics Multipolymer | 1.52 |
| Polyethylene (Medium Density) | 1.52 |
| Styrene Butadiene Thermoplastic | 1.52-1.55 |
| PVC (Rigid) | 1.52-1.55 |
| Nylons (Polyamide) Type 6/6 | 1.53 |
| Urea Formaldehyde | 1.54-1.58 |
| Polyethylene (High Density) | 1.54 |
| Styrene Acrylonitrile Copolymer | 1.56-1.57 |
| Polystyrene (Heat & Chemical) | 1.57-1.60 |
| Polystyrene (General Purpose) | 1.59 |
| Polycarbornate (Unfilled) | 1.586 |
| Magnesium Fluoride | 1.35 |

The invention is not restricted to the examples and embodiments described above. The examples and embodiments are not intended as limitations on the scope of the invention; and methods, apparatus, compositions, materials, and the like described herein are exemplary and not intended as limitations on the scope of the invention. Changes and other uses will occur to those skilled in the art. As such, the scope of the invention is defined by the scope of the claims.

We claim:

1. A non-dichroic omnidirectional structural color comprising:
a multilayer stack having an absorbing layer, a first layer made from a first material having a first index of refraction and a first predefined thickness extending across said absorbing layer, and a second layer made from a second material having a second index of refraction and a second predefined thickness extending across said first layer;
said absorbing layer is selected from the group consisting of chromium, nickel, carbon, graphite, graphene, titanium, vanadium, aluminum, cobalt, silver, molybdenum, niobium, iron, steel, tungsten and alloys thereof;
said multilayer stack reflecting a single narrow band of visible electromagnetic radiation having a reflectance between 65-80% of incident light waves, a width of less than 200 nanometers and a center wavelength shift of less than 50 nanometers when viewed from angles between 0 and 45 degrees and exposed to a source of broadband electromagnetic radiation.

2. The non-dichroic omnidirectional structural color of claim 1, wherein said multilayer stack has a third layer and a fourth layer on an opposite side of said absorbing layer.

3. The non-dichroic omnidirectional structural color of claim 2, wherein said third layer and said fourth layer are made from said first material and said second material, respectively.

4. The non-dichroic omnidirectional structural color of claim 3, wherein said third layer and said fourth layer have a thickness equal to said first predefined thickness and said second predefined thickness, respectively.

5. The non-dichroic omnidirectional structural color of claim 1, wherein said absorbing layer is selected from the group consisting semi-opaque materials and opaque materials.

6. The non-dichroic omnidirectional structural color of claim 1, wherein said absorbing layer is a visually dark oxide.

7. The non-dichroic omnidirectional structural color of claim 6, wherein said visually dark oxide is selected from the group consisting of biotite, doped mica, aluminum oxide, doped aluminum oxide, neodymium oxide, tungsten oxide, iron oxide and combinations thereof.

8. The non-dichroic omnidirectional structural color of claim 1, wherein said multilayer structure is a paint pigment.

9. The non-dichroic omnidirectional structural color of claim 8, further comprising a binder mixed with said paint pigment to form a paint, said paint blocking electromagnetic radiation reflected off of a primer layer when said paint is applied thereto.

10. The non-dichroic omnidirectional structural color of claim 9, further comprising a paint additive mixed within said paint, said paint pigment blocking electromagnetic radiation reflected off of said paint additive when said paint is exposed to said source of broadband electromagnetic radiation.

11. The non-dichroic omnidirectional structural color of claim 1, further comprising a substrate, said multilayer stack being a coating on said substrate.

12. The non-dichroic omnidirectional structural color of claim 11, wherein said substrate is a particle.

13. A process for producing a non-dichroic omnidirectional structural color paint pigment, the process comprising:
providing an absorbing layer, the absorbing layer being selected from the group consisting of chromium, nickel, carbon, graphite, graphene, titanium, vanadium, aluminum, cobalt, silver, molybdenum, niobium, iron, steel, tungsten and alloys thereof;
providing a first layer extending over the absorbing layer, the first layer having a first thickness and a first index of refraction;
providing a second layer extending over the first layer, the second layer having a second thickness and a second index of refraction, the absorbing layer, first layer and second layer reflecting a single narrow band of visible electromagnetic radiation having a reflectance of between 65-80% of incident light waves, a width of less than 200 nanometers and a center wavelength shift of less than 50 nanometers when viewed from angles between 0 and 45 degrees and exposed to a source of broadband electromagnetic radiation.

14. The process of claim 13, further including a substrate and providing the absorbing layer, first layer and second layer on the substrate.

15. The process of claim 14, wherein the substrate is a particle and the particle is coated with the absorbing layer, first layer and second layer.

* * * * *

UNITED STATES PATENT AND TRADEMARK OFFICE
CERTIFICATE OF CORRECTION

PATENT NO. : 10,048,415 B2
APPLICATION NO. : 15/457136
DATED : August 14, 2018
INVENTOR(S) : Debasish Banerjee et al.

It is certified that error appears in the above-identified patent and that said Letters Patent is hereby corrected as shown below:

On the Title Page

In Page 02, Column 02, Item (56), References Cited, US Patent Documents, Cite No. 48, delete "Mt et al." and insert --Arlt et al.--, therefor.

In Page 04, Column 01, Item (56), References Cited, Other Publications, Cite No. 04, delete "Tachnique" and insert --Technique--, therefor.

In the Specification

In Column 04, Line 56, delete "of "leaking or" and insert --of leaking or--, therefor.

In Column 08, Line 25, delete "Cos($\delta_H+\delta_H$)" and insert --Cos($\delta_H+\delta_L$)--, therefor.

In Column 13, Line 23, delete "($0^0$ and $0^0$)" and insert --($0^0$ and $\theta^0$)--, therefor.

Signed and Sealed this
Second Day of October, 2018

Andrei Iancu
*Director of the United States Patent and Trademark Office*